12/29/87 /350 XR 4,715,688

United States Patent [19]

Harada et al.

[11] Patent Number: 4,715,688
[45] Date of Patent: Dec. 29, 1987

[54] FERROELECTRIC LIQUID CRYSTAL DISPLAY DEVICE HAVING AN A.C. HOLDING VOLTAGE

[75] Inventors: Takamasa Harada; Masaaki Taguchi; Koji Iwasa, all of Tokyo, Japan

[73] Assignee: Seiko Instruments Inc., Tokyo, Japan

[21] Appl. No.: 679,760

[22] Filed: Dec. 10, 1984

[30] Foreign Application Priority Data

Jul. 4, 1984 [JP] Japan ..... 59-138832
Oct. 15, 1984 [JP] Japan ..... 59-215363

[51] Int. Cl.[4] ..... G02F 1/13
[52] U.S. Cl. ..... 350/350 S; 350/333
[58] Field of Search ..... 350/350 S, 332, 333

[56] References Cited

U.S. PATENT DOCUMENTS 4,367,924 1/1983 Clark et al. ..... 350/334
4,508,429 4/1985 Nagae et al. ..... 350/350 S
4,548,476 11/1985 Kaneko ..... 350/350 S

*Primary Examiner*—Stanley D. Miller
*Assistant Examiner*—Richard F. Gallivan
*Attorney, Agent, or Firm*—Bruce L. Adams; Van C. Wilks

[57] ABSTRACT

A liquid crystal display device utilizing a ferroelectric liquid crystal, e.g., a chiral smectic liquid crystal aligned to establish two bi-stable display states. The display device is driven in a time-sharing mode. The change of the bi-stable display states is effected by applying a selected voltage to the changed ferro-electric liquid crystal. Thereafter the display state is held by applying an A.C. pulse voltage.

41 Claims, 48 Drawing Figures

FERROELECTRIC LIQUID CRYSTAL DISPLAY DEVICE HAVING AN A.C. HOLDING VOLTAGE

BACKGROUND OF THE INVENTION

This invention relates to a liquid crystal display device, the liquid crystal display device is driven by a low voltage, a power consumption thereof is very small, a whole shape is made thin and small, and it is used for a watch, calculator etc. Recently, CMOS-LSI of semiconductor is developed, and a great dimension and capacity of liquid crystal display device are developed. Accordingly, a liquid crystal display device is applied to a personal computer and OA instruments. A liquid crystal display device will be used for many kinds of information processing instruments due to a merit of being directly driven with CMOS-IC. In this case, it is a very important problem how the liquid crystal display device attains a display capacity and response time as the same level of CRT display device. The present invention provides a liquid crystal display device which is able to have a great capacity and high speed response for high level information processing instruments.

In the conventional liquid crystal for a display use, a thermotropic liquid crystal is used and has many kinds of liquid crystal phase in different certain temperature ranges determined by a material thereof. As a rough classification, there are a nematic phase which has not a layer structure (referred to as N) and a smectic phase which has a layer structure (referred to as S m).

S m is classified as a smectic A phase of a axial characteristic (referred to as S m A) and a smectic C phase of a bi-axial characteristic (referred to as S m C). The thickness of a layer is almost equal to the length of one liquid crystal molecule.

FIGS. 1(*a*), 1(*b*) and 1(*c*) show various molecular alignments, FIG. 1(*a*) shows N, FIG. 1(*b*) shows S m A, and FIG. 1(*c*) shows S m C.

Furthermore, if a liquid crystal molecule has a asymmetric carbon atom and has not a racemic modification, it is aligned to form a spiral molecular alignment. In case of N, along axis of a liquid crystal molecule is located along a thin layer, and molecules align in one direction. A molecular direction in a layer is gradually twisted between layers to form a chiral nematic phase. FIG. 2 shows a molecular alignment the chiral nematic. In case of S m, a molecule is aligned in a spiral alignment in which a spiral axis alignes in a normal line direction of a layer to form a chiral smectic c phase (referred to S m C*).

FIG. 3(*a*) shows a molecular alignment of S m C*.

Referred to S m C* particularly, a long axis direction (referred to as a molecular axis hereafter) of a liquid crystal molecule in one layer is inclined by only angle $\theta$ relative to normal direction of a layer, and this angle $\theta$ is constant in every layers.

FIG. 3(*b*) shows the relation of a molecular axis and the normal direction.

On the other hand, in case when a molecular alignment of S m C* is viewed from the normal direction of layer, a direction angle $\phi$ successively rotates through layers according to a constant value (FIG. 3*a* shows a change by every 45°) whereby a molecular alignment causes a spiral construction. Generally S M C* has not only a spiral construction but also an electric dipole in a vertical direction relative to a molecular axis and shows a ferroelectric characteristic.

A ferro-electric liquid crystal is discovered by Meyer in 1975 (J. de. phys. 36, 69, 1975). A synthesized liquid crystal is, generally speaking, DOBAMBC (2-methyl butyl P-[(P-n-decyloxybenzyliden)amino])

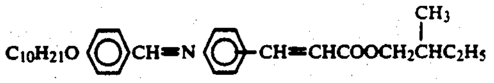

and it is used for a research of ferro-electric liquid crystal.

S m C* has a spiral construction, the pitch of the spiral construction differs according to a liquid crystal, and generally, it is several $\mu$m as many cases. If S m C* liquid crystal is poured into a gap of a cell of 1 $\mu$m which is thinner than the pitch of spiral, then a spiral construction disappears. A molecular alignment construction after a spiral construction disappeared is shown in FIG. 4 with a geometrical relation to a cell base plate. A liquid crystal molecule is aligned in parallel to the cell base plate, i.e., a molecular axis is in parallel with the base plate, and the liquid crystal molecule is aligned in an inclined condition of $\theta$ from the normal line direction of layer, and in this case, the normal line direction is parallel to the base plate.

Therefore, the layer is formed vertically relative to the base plate. In case of the inclined condition of $\theta$ from the normal direction of layer, there are domains in which a molecule is inclined $+\theta$ toward the clockwise direction from the normal line and other domains in which a molecule is inclined $-\theta$ toward the counterclockwise direction from the normal line.

S m C* liquid crystal molecule has generally an electric dipole vertical to the molecular axis. If the electric dipole is aligned toward an upper direction relative to the cell base plate in one domain, another electric dipole of another molecule is aligned toward a lower direction in another domain. If an electric field is applied between cell base plates, the whole liquid crystal molecules of the cell are aligned in an inclined position of $+\theta$ or $-\theta$ from the normal line direction of the layer (+ or − is determined by a direction of the electric dipole, and these are so called as $+\theta$ position or one of the bi-stable alignments and $-\theta$ position) or the other of the bi-stable alignments.

The liquid crystal molecule moves from $+\theta$ position to $-\theta$ position or $-\theta$ position to $+\theta$ position when the electric field is applied thereto in a direction opposite to the direction of the electric dipole. This phase construction is that of S m C since whole molecules of the cell are aligned in $+\theta$ position or $-\theta$ position, therefore, this bi-stable phase is made by the extinguishment of the spiral construction according to a thin gap of a cell. But, in the S m C, the molecule moves along a cone as shown in FIG. 3*b* as an image of spiral construction when it moves from $\pm\theta$ position to a contrary position thereof. An usual phase having a spiral construction does not cause this movement when an electric field is applied thereto. It is able to use the cell as a display device by moving or switching the liquid crystal molecule between $+\theta$ position and $-\theta$ position by attaching a polarizing member on a pair of cell base and by selecting electric field polarity.

FIGS. 5(*a*) and 5(*b*) show a relation between a pair of polarizing members and $\pm\theta$ position of liquid crystal molecule for use as a display device.

In FIG. 5(*a*), a polarizing axis of a polarizing member disposed on an incidence side corresponds to $+\theta$ position, a polarizing axis of another polarizing member disposed on an outgoing side is rotated by 90° from the polarizing axis of the polarizing member on the incidence side.

In FIG. 5(*a*), a light which is polarized by the polarizing member on the incidence side is transmitted to the outgoing side without change of the polarizing direction when the liquid crystal molecules take $+\theta$ position, and the light does not pass through the outgoing side since the polarizing members cross with each other. This condition is a dark condition, or one of the two bi-stable display states. On the other hand, the polarizing direction of the light by a double refraction of the liquid crystal when the liquid crystal molecules is moved to $-\theta$ position. Said $\theta$ is 22.5°, and if the cell thickness is a preferable value, almost of the light passes through the polarizing member on the outgoing side whereby a bright condition or the other of the two bi-stable display states is obtained.

Therefore, it is necessary to have a relation between the cell thickness "d" and an anisotropy $\Delta n$ of the refraction rate of the liquid crystal as follows:

$$d=(2n-1)\alpha/\Delta n$$

n: refraction rate $$\alpha=c\pi/\omega$$

c: light speed $\omega$: angular frequency of light

FIG. 5(*b*) shows a condition in which the two polarizing members on the incidence and outgoing sides are same so that $+\theta$ position is bright and $-\theta$ position is dark. A relation of the cell thickness and $\Delta n$ is the same as above formula, preferable bright and dark conditions are attained when $\theta=22.5°$. This idea of display device is presented by Clark and Lgerwall (Appl. phys. lett. 36, 899, 1980). They insisted that a display device in which a thin cell has a pair of polarizing members has a feature as follows:

(1) high speed response in μsec order (2) memory characteristic (3) preferable threshold value characteristic The high speed response among these characteristics is confirmed by our experimentation.

Further, the memory characteristic namely the stability of the bi-stable alignment, which is able to keep the $+\theta$ positions without application of the electric field after one of $\pm\theta$ positions was set by applying an electric field thereto, is also confirmed. But, a preferable threshold value characteristic is not confirmed by us.

FIG. 6 shows a relation between an optical transparent intensity I of the display state and an applied voltage V when there is a threshold value characteristic.

A molecule does not move and the optical transparent intensity does not change when the applied voltage is less than $V_{th}$. The molecule begins to move at more than $V_{th}$ and, at this time, the optical transparent intensity remarkably changes according to the applied voltage.

If the applied voltage becomes greater than $V_{sat}$, the optical transparent intensity will not change any more, because the molecule is fixed in $\pm\theta$ position. These $V_{th}$ and $V_{sat}$ are good parameters to represent the threshold value.

According to our data, $V_{th}$ and $V_{sat}$ are as follows:

$V_{th}=500$ (mV)

$V_{sat}=5$ (V) (measured by DOBAMBC)

It is not able to drive a display device by 5V in a selected point and 500 mV in a non-selected and a half selected point during a time-sharing drive of the display.

SUMMARY OF THE INVENTION

The object of the invention is to provide new display principle and driving method of time-sharing drive for S m C* liquid crystal, particularly, to obtain a multi-sharing LC display in the field which is not attained by TN type LC display method.

DETAILED DESCRIPTION OF THE INVENTION

Figure 1A:
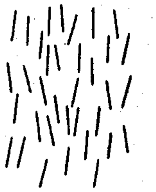
FIGS. 1(*a*), (*b*) and (*c*) are model illustrations of molecular alignment of N, SmA, SmC, respectively.
Figure 1B:
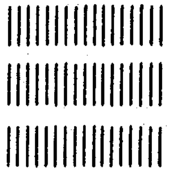
Figure 1C:
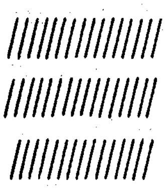
Figure 2:
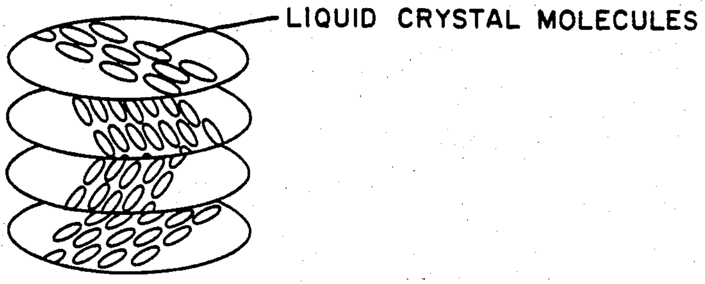
FIG. 2 is a model illustration of molecular alignment is chiral N.
Figure 3A:
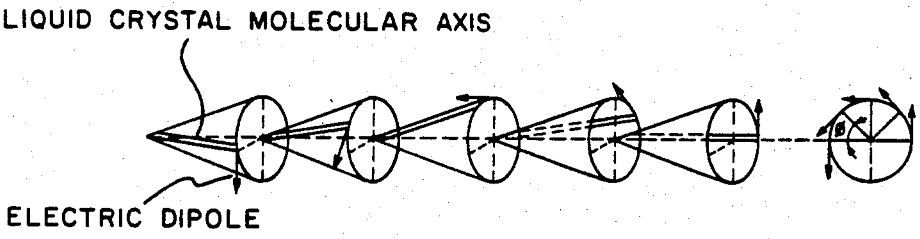
FIGS. 3(*a*) and (*b*) are model illustrations of molecular arrangement around the spiral axis and of a position of one molecule of SmC*, respectively.
Figure 3B:
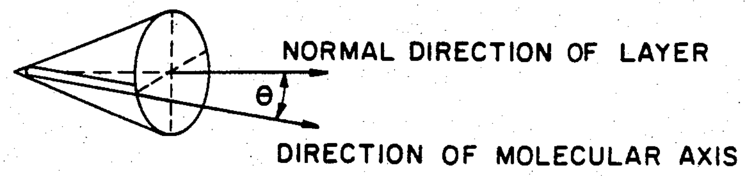
Figure 4:
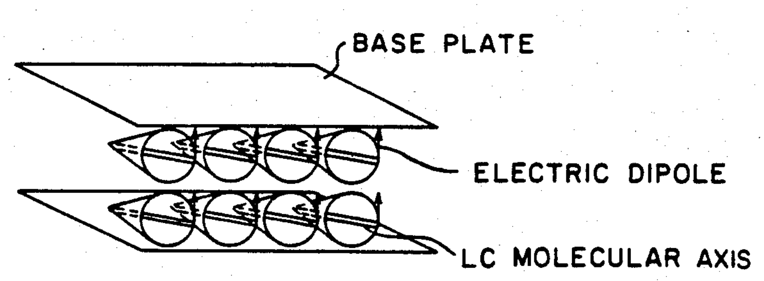
FIG. 4 is a model illustration of molecular arrangement relative to the base plates in case of a thin cell gap, e.g., about 1 μm.
Figure 5A:
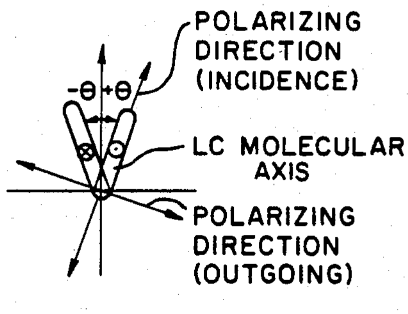
FIGS. 5(*a*) and (*b*) are model illustrations showing molecular state and conventional display principle.
Figure 5B:
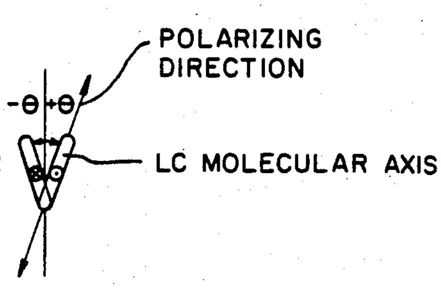
Figure 6:
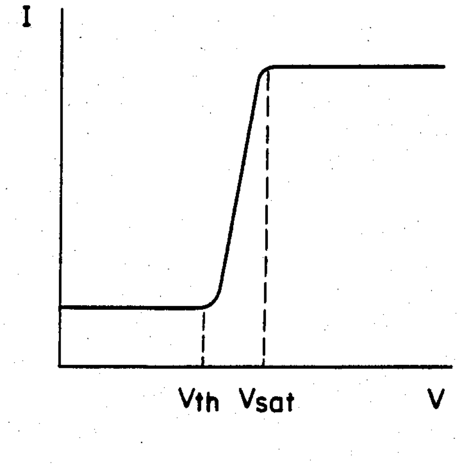
FIG. 6 is a graph showing a relation between transparent intensity and an applied voltage in case of having a threshold caracteristic when the voltage is applied in a bright condition.

Before understanding a principle of the invention, a change of optical transparent intensity is explained when AC pulses are applied to a LC panel after DC voltage applied to a LC pannel as shown in FIG. 5(*a*) in which the cell thickness is about 1 μm smaller than a pitch of a spiral alignment of the ferro-electric liquid crystal molecules so that the liquid crystal loses the spiral alignment to re-align in two bi-stable alignments are described hereinbefore.

Figure 7:
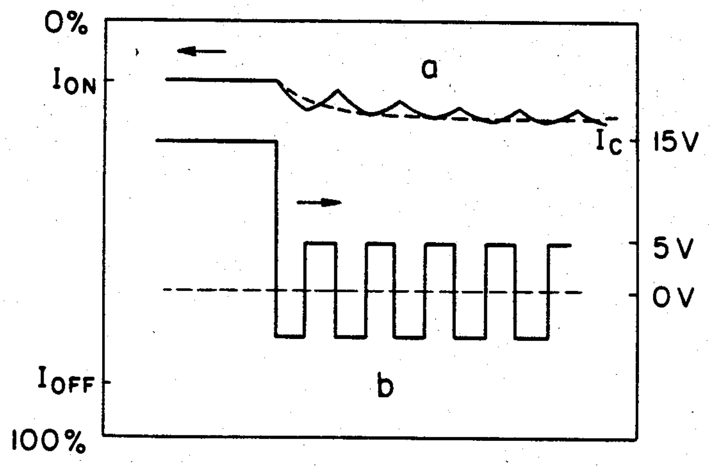
FIG. 7 shows a change of optical transparent intensity when AC pulses are applied to an liquid crystal just after DC voltage is applied.

FIG. 7 shows a change of optical transparent intensity when a voltage waveform is applied to the LC panel. A vertical axis shows optical transparent intensity. $I_{ON}$ designates the optical transparent intensity when more than $V_{sat}$ voltage of one polarity is applied to the LC pannel having crossed polarizing members which intercept incidence light. $I_{OFF}$ shows the optical transparent intensity when more than $V_{sat}$ having another polarity is applied to the panel so that the panel becomes the most transparent condition. In FIG. 7, a polarity and voltage is value of DC voltage selected so that the optical transparent intensity becomes $I_{ON}$. The optical transparent intensity becomes $I_{ON}$ by applying 15 V DC voltage, and after that, the optical transparent intensity gradually becomes a constant optical transparent intensity $I_c$ with a vibration. The intensity $I_c$ is smaller than $I_{ON}$, but it is able to use as a black level (dark level). On the other hand, the optical transparent intensity corresponds to, the optical intensity of which is changed from $I_{OFF}$ to constant Ic' with a vibration by applying DC voltage of contrary polarity effective to get $I_{OFF}$ and after that applying AC pulse ±5 V thereto. In this case, Ic' is greater than $I_{OFF}$, and is able to use as a white (bright) level.

Figure 8:
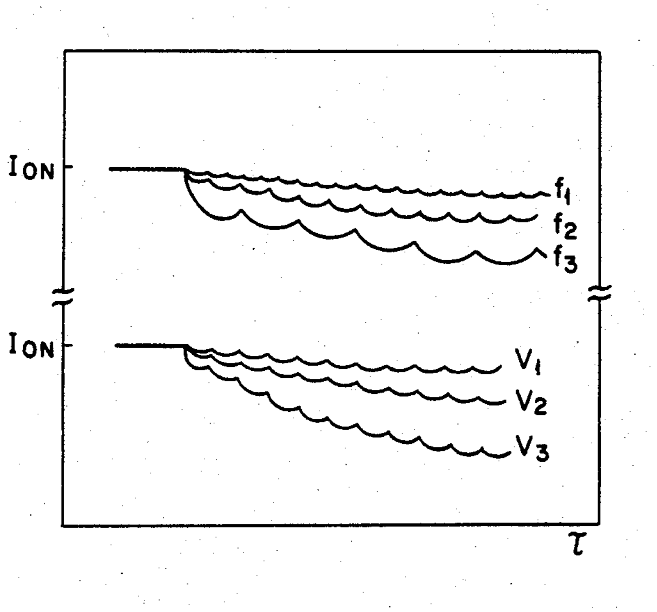
FIG. 8 shows a change of optical transparent intensity when AC pulse amplitude and frequency are changed in FIG. 7.

FIG. 8 shows an optical transparent intensity change when AC pulses of voltage waveform and voltage amplitude are changed.

In case of changing frequency, three optical transparent intensity profiles in upper portion of FIG. 8 are observed.

Between frequencies $f_1$, $f_2$ and $f_3$, $$f_1 > f_2 > f_3$$

The higher the frequency of AC pulse is, the higher the optical transparent intensity $I_c$ becomes and it is hardly attenuated. Further, in case of changing voltage amplitude of AC pulse, three optical transparent intensity profiles in lower portion of FIG. 8 are observed.

Between voltage amplitude $V_1$, $V_2$ and $V_3$, $$V_1 < V_2 < V_3$$

The smaller the voltage amplitude of AC pulse is, the higher the optical transparent intensity $I_c$ becomes and it is hardly attenuated.

In the present invention, a display state of the picture elements are changed by a display condition or state obtained by applying a selecting voltage, e.g., DC voltage and after that, the display condition is held according to a holding AC voltage. Namely, in molecular level, LC molecule is moved to $+\theta$ or $-\theta$ position by applying a selecting voltage, e.g., DC voltage or pulse, and after that, the LC molecules is held in $+\theta$ or $-\theta$ position by AC pulse, whereby a display is obtained.

Figure 9:
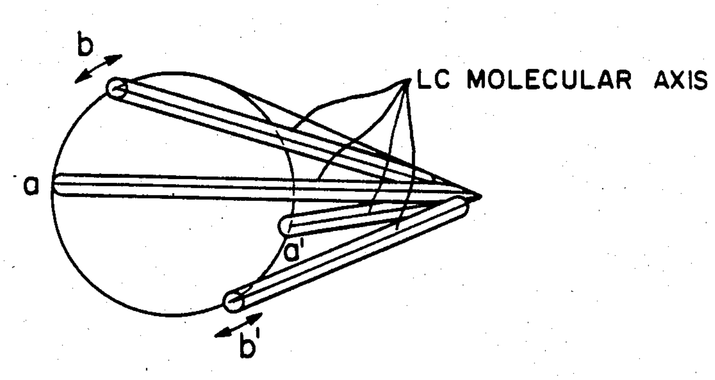
FIG. 9 shows a model of molecular state in a display device of the present invention.

FIG. 9 shows molecular movement in case of displaying a display according to the present invention. When DC voltage or pulse is applied to a molecule, the molecule moves to "a" or "a'" position ($\pm\theta$ position) of FIG. 9, and after that, the molecule moves with a vibration by AC pulse and stays in "b" or "b'" position. The "b" or "b'" position is greatly affected by the cell thickness, alignment condition, voltage amplitude of AC pulse and frequency.

Referring now to the present invention, display is attained by using a molecular alignment which is not parallel to base plates or polarizers. The condition is that the molecules are shifted from the $\pm\theta$ position which is parallel to the base plate. That is quite new display principle.

Figure 10:
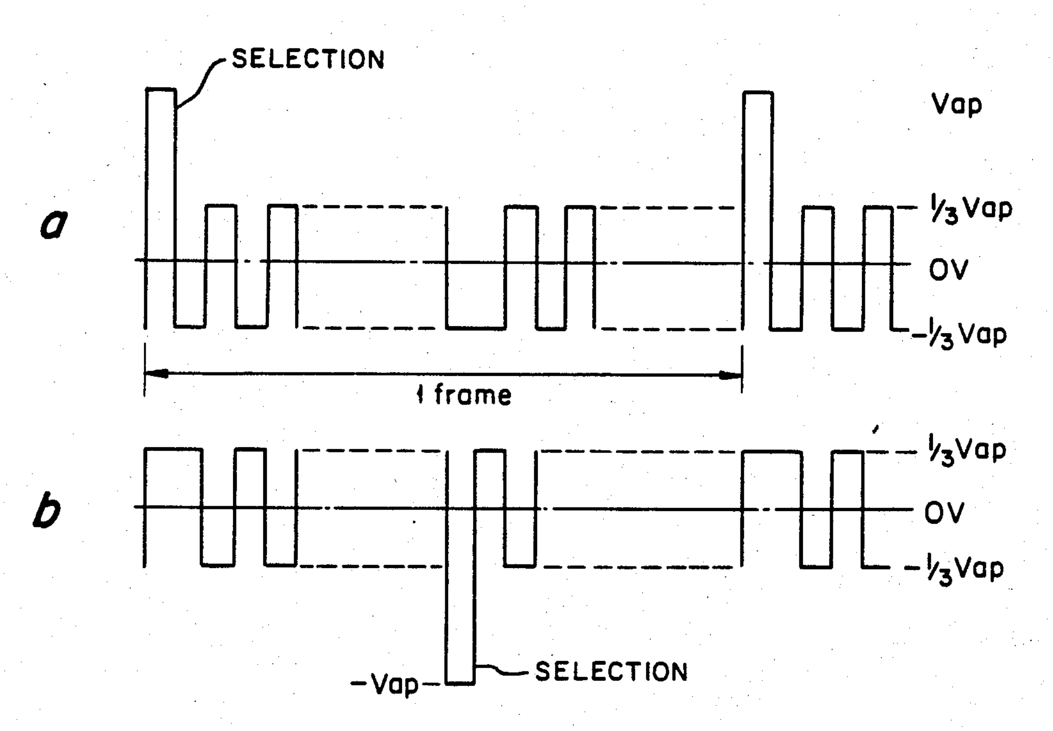
FIG. 10 shows one embodiment of driving waveform of the first driving method which drives LC when the present invention is used in time-sharing driving system.

FIGS. 10(*a*) and (*b*) show one embodiment of driving waveform for LC panel in accordance with a line sequential scanning system.

Electrodes are arranged to form X–Y matrix, and electric potential is measured with respect to a scanning electrode side. FIGS. 10(*a*), (*b*) show voltage applied to one picture element of X–Y matrix scanning the scanning electrodes of the X–Y matrix electrodes. Dark and bright display states are determined by polarizing member and molecular positions are shown in FIG. 5(*a*). If the polarizing member is reversed as shown FIG. 5(*b*) (i.e., a polarizing axis of the polarizing member on the outgoing side is aligned in $-\theta$ position, a polarizing axis of the other polarizing member on the incidence side is aligned in crossing condition), bright and dark display states are reversed each other.

A molecular position is determined by a direction of electric dipole and a polarity of voltage applied to the picture element, and dark and bright display states are determined by the arrangement of the polarizing members. Accordingly, the display is obtained by two driving waveforms, for simply explaining, FIG. 10*a* shows a dark condition and FIG. 10*b* shows a bright condition.

A vibration waveform a drive voltage applied to one picture element during in FIG. 10 shows a line sequential scanning. The display electrode provides a positive potential $+V_{ap}$ relative to a scanning electrode in a selecting timing, or time slot assigned to that picture element, after that, and the display electrode provides a negative potential $-\frac{1}{3} V_{ap}$, and finally the display electrode provides AC pulses during a non-selected timing or time slots assigned to other picture elements.

A driving waveform "b" in FIG. 10 becomes $\frac{1}{3} V_{ap}$ when the driving waveform "a" becomes positive $V_{ap}$ (positive or negative potential is determined with respect to the scanning electrode potential), and after that, the waveform "b" becomes $+\frac{1}{3} V_{ap}$ at a timing when the driving waveform "a" becomes $-\frac{1}{3} V_{ap}$ and finally it becomes AC pulses. The scanning electrode provides minus potential $-V_{ap}$ during a second selecting timing, and after that, the scanning electrode provides $+\frac{1}{3} V_{ap}$, and finally the scanning electrode provides an AC pulse signal.

A driving waveform "a" becomes $-\frac{1}{3} V_{ap}$ in a timing in which the driving waveform "b" becomes $-V_{ap}$ and $\frac{1}{3} V_{ap}$.

FIGS. 10(*a*), (*b*) show writing of dark and bright display states into the picture element by two scannings of the scanning electrode. One frame for writing the dark and bright display states is equal to two frames of general line sequential scanning, a writing scanning for the dark is a first scanning, and a writing scanning for the bright display state is a second scanning. A ferroelectric LC molecules driven according to the driving waveforms "a" and "b" shown in FIG. 10 moves to "a" or "a'" position of FIG. 9 or near position thereof when a selecting signal having a large electric power or a high voltage $V_{ap}$ is applied, and after that, said LC molecule vibrates in "b" or "b'" position by applying a holding signal having a small electric power or small ± equal AC voltage insufficient to move the molecule to "a" or "a'" position. In this case, by selecting a driving frequency of the waveform, the LC molecule is set to be operated in "a" or "a'" position of FIG. 9 by a high voltage. Namely, a driving frequency is fD, a response time of LC molecule under application of voltage $V_{ap}$ is $\tau$, $$\tau \leqq \frac{1}{3} fd$$

A relation between a response time and the voltage is as follows:

$$\tau=(\eta d)/(PsV)$$

$\rho$ = rotary viscosity
Ps = self polarization
d = cell thickness $\eta$, Ps and d are constant, $$\tau \propto 1/V$$

Figure 11:
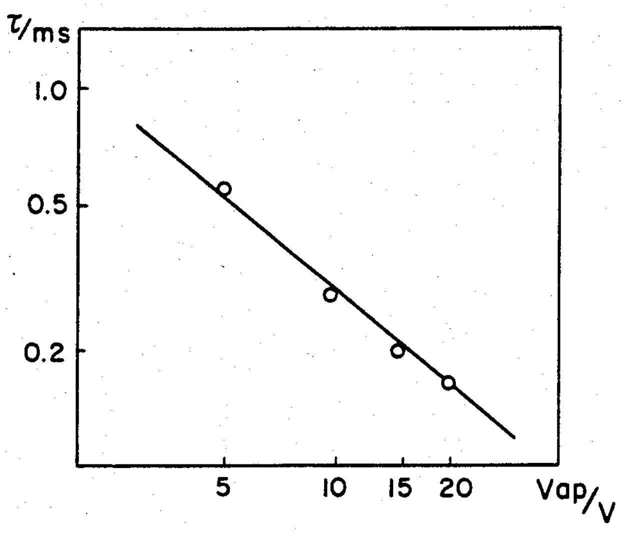
FIG. 11 shows a relation between an applied voltage and a response time.

FIG. 11 shows a relation of a response data and voltage in a logarithm.

This data is almost linear, and it is understood from the relation $\tau \propto 1/V$, that a response becomes faster according to a higher voltage, and it is able to get a larger driving frequency than $\tau \leqq \frac{1}{3}$ fD because the molecule moves to "a", "a'" of FIG. 9 in a short time. It is available to set a driving frequency and the voltage so as to achieve a good display condition in a range in which the display quality is not affected by a kind of display (stationary display or moving display) or driving device.

Figure 12:
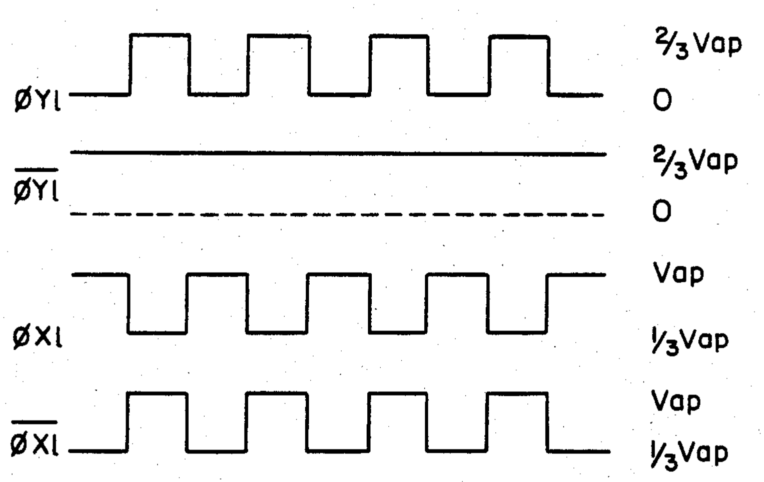
FIGS. 12–17 show basic signal waveforms so as to apply $\pm\frac{1}{3}V_{ap}$ AC pulse during non-selecting period and $\pm V_{ap}$ during selecting period in the first driving method.
Figure 13:
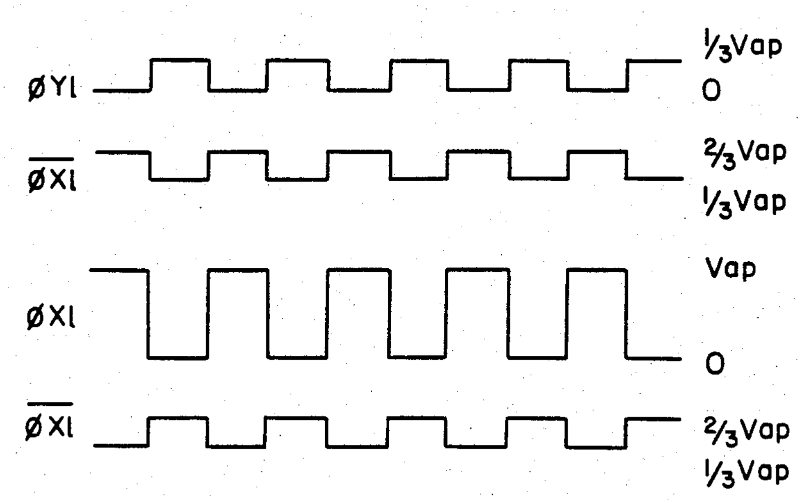
Figure 14:
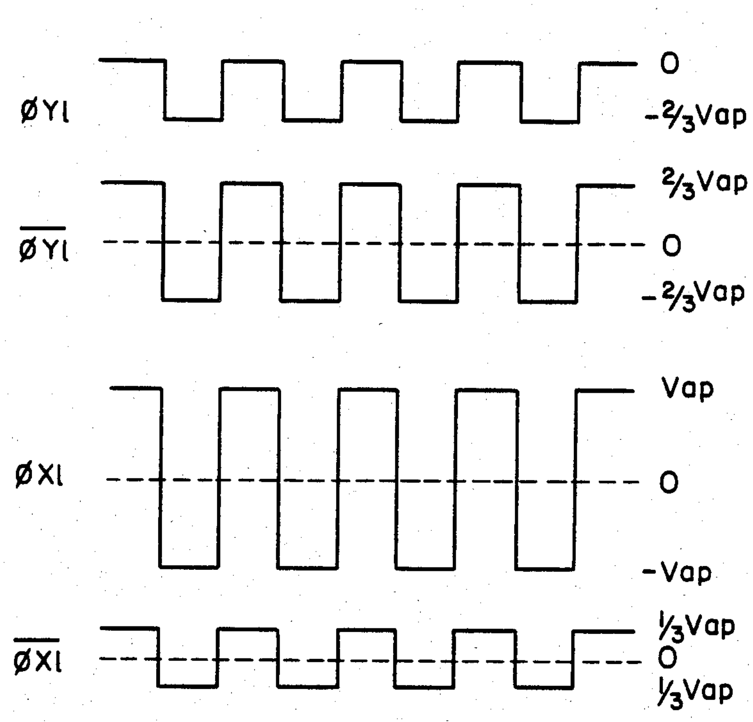

Three embodiments of a drive signal used in the first scanning in one frame are shown in FIGS. 12, 13 and 14, where $\phi Y1$: selecting scanning electrode signal
$\overline{\phi Y1}$: non-selecting scanning electrode signal
$\phi X1$: selecting display electrode signal
$\phi X1$: non-selecting display electrode signal A positive $V_{ap}$ is applied to a picture element to select a dark display state, and after that, AC pulses of $\pm\frac{1}{3} V_{ap}$ amplitude is applied to hold the dark condition.

Figure 15:
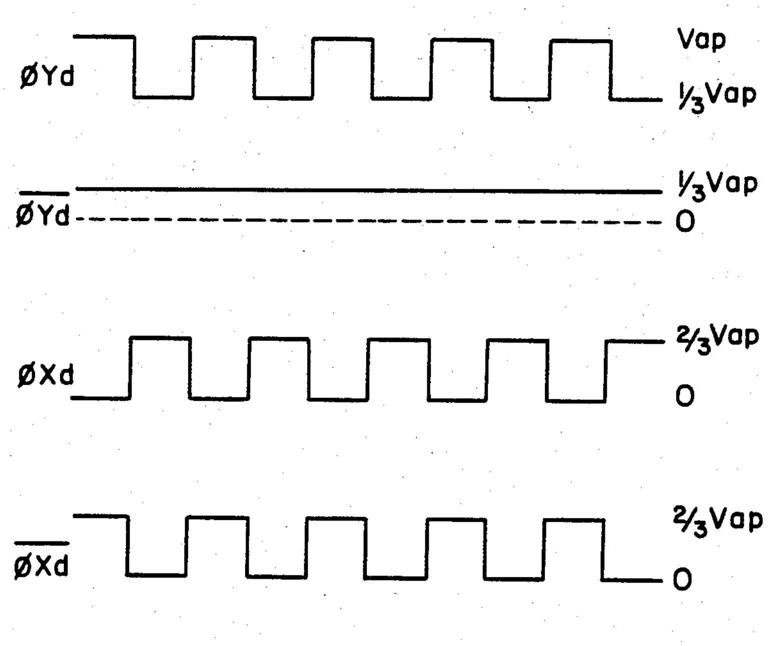
Figure 16:
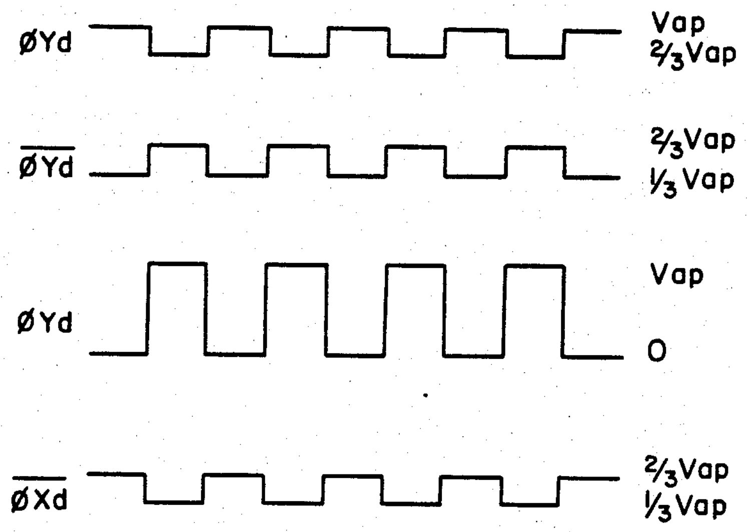
Figure 17:
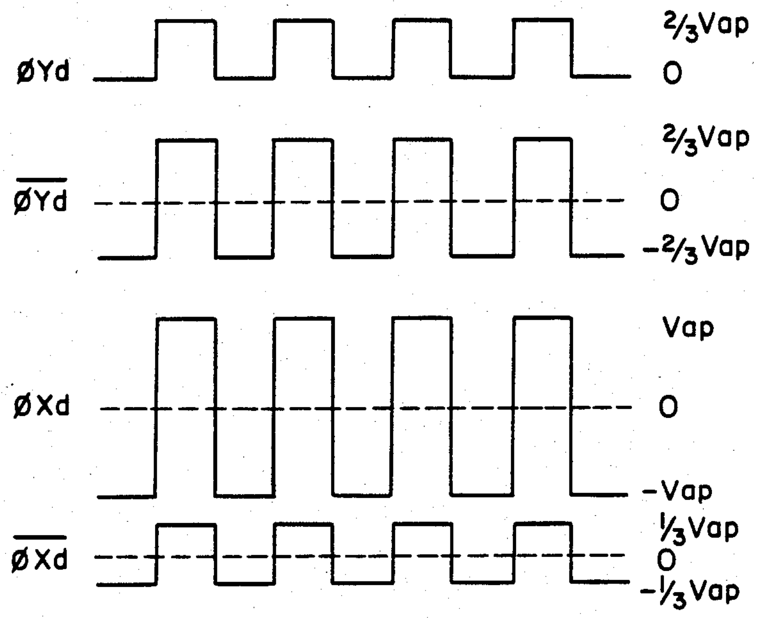
Figure 18A:
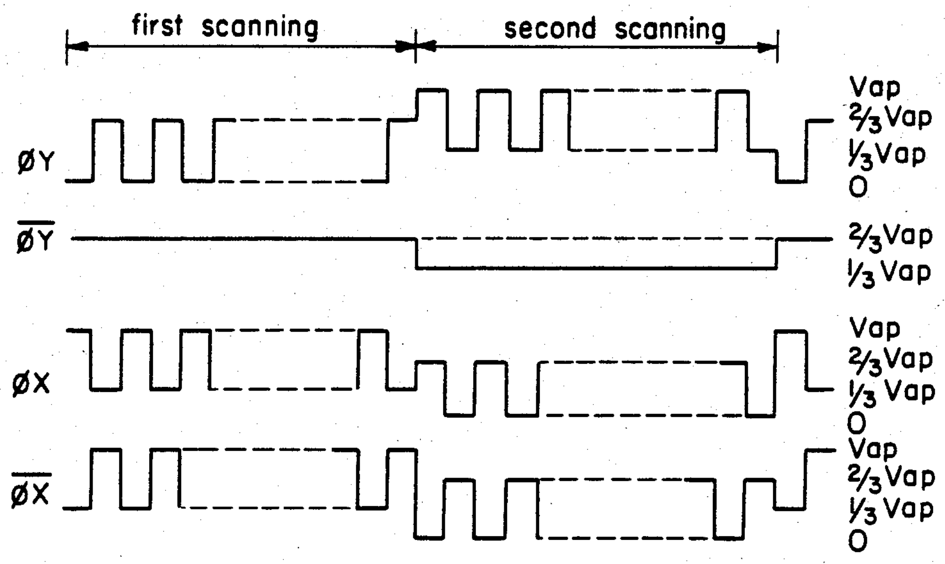
FIGS. 18(*a*), 18(*b*) and 18(*c*) show $\phi Y$, $\phi Y$, $\phi X$ and $\phi X$ signals used in basic signals of FIGS. 12–17 in the driving method.
Figure 18B:
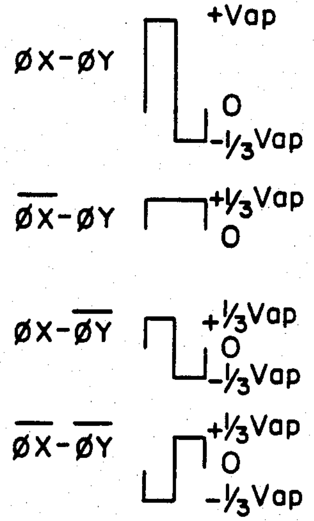
Figure 18C:
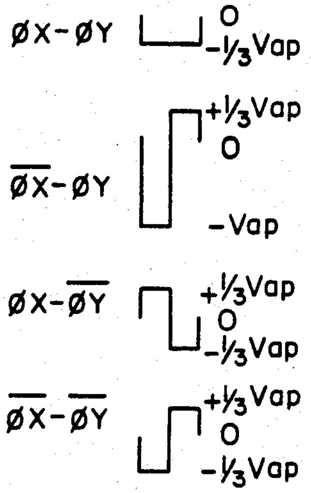
Figure 19:
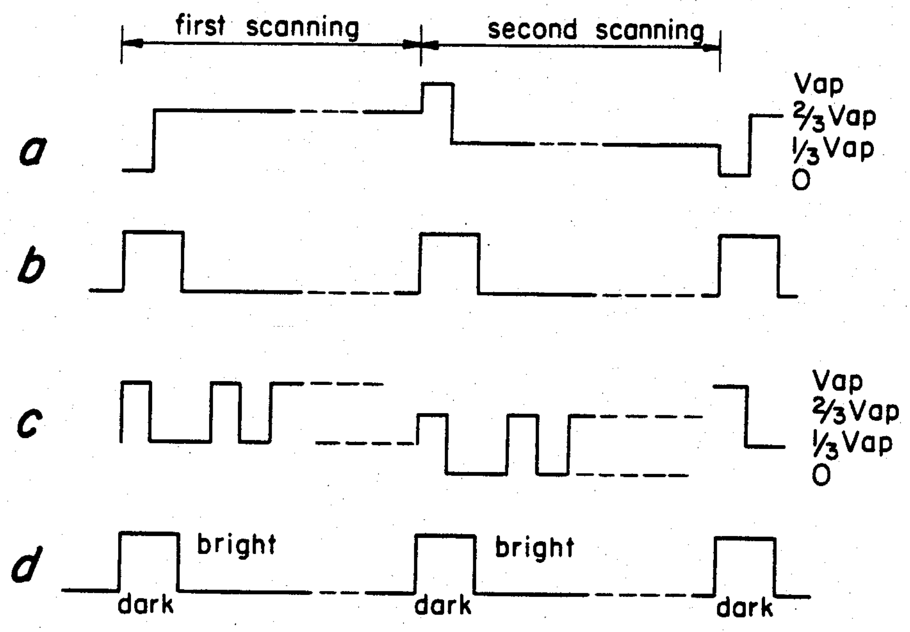
FIG. 19 shows signals for a scanning electrode and a display electrode formed by selecting the $\phi Y$, $\phi Y$, $\phi X$ and $\phi X$ of FIGS. 18(*a*), 18(*b*) and 18(*c*) by the scanning signal and display data.

Three embodiments of a signal in the second scanning in one frame are shown in FIGS. 15, 16 and 17, where $\phi Yd$: selecting scanning electrode signal
$\overline{\phi Yd}$: non-selecting scanning electrode signal
$\phi Xd$: selecting display electrode signal
$\overline{\phi Xd}$: non-selecting display electrode signal A negative $V_{ap}$ is applied to a picture element, and after that, AC pulses of $\pm\frac{1}{3} V_{ap}$ amplitude is applied to hold the dark condition. Among signals, FIGS. 12, 13, 15 and 16 show DC pulse signals, and FIGS. 14 and 17 show AC pulse signals. Actually, it is able to synthesize $\phi Y$, $\overline{\phi Y}$, $\phi X$ and $\overline{\phi X}$ by conbining signals of FIGS. 15–17 and FIGS. 12–14. FIG. 18(*a*) shows one embodiment of $\phi Y$, $\overline{\phi Y}$, $\phi X$ and $\overline{\phi X}$ which is synthesized by combining the first scanning signals of FIG. 12 and the second scanning signals of FIG. 15. The second signal $\phi Xd$ and $\overline{\phi Xd}$ are reversed to $\phi X$ and $\overline{\phi X}$ to commonly use a display data in two scannings (first and second scannings). FIG. 8(*b*) shows waveforms which are applied to a selected picture element and a non-selected picture element during the first scanning operation. DC pulse "$\phi X$-$\phi Y$" is applied to a selected picture element, and AC pulse "$\overline{\phi X}$-$\overline{\phi Y}$" is applied to non picture element. FIG. 18(*c*) shows wave-forms which are applied to a selected picture element and a non-selected picture element in the second scanning. FIG. 19 shows one embodiment of a voltage waveform which is applied to a display electrode based on a display data and a voltage waveform which is applied to a scanning electrode by using $\phi Y$, $\overline{\phi Y}$, $\phi X$ and $\overline{\phi X}$.

A voltage waveform "a" in FIG. 19 shows a waveform which is applied to a scanning electrode, a selecting scanning electrode signal $\phi Y$ in FIG. 18 is selected by a timing of high level line sequential scanning signal "b", non-selecting scanning electrode signal $\phi Y$ in FIG. 18 is selected by a low level thereof.

A voltage waveform "c" shows a waveform which is applied to a display electrode, and the voltage waveform "c" is formed of the selecting display electrode signal $\phi X$ of FIG. 18 at timing of high level display data "d" (dark condition) and non-selecting display electrode signal $\overline{\phi X}$ of FIG. 18 at timing of low level display data "d" (bright condition).

A driving waveform "a" of FIG. 10 shows a change of display electrode potential relative to the scanning electrode when the waveforms "a" and "b" are applied between the scanning electrode and display electrode.

Driving waveforms "a" and "b" shown in FIG. 10 are comprised of $\pm V_{ap}$ pulses during a half time of the selecting time assigned to the selecting electrode, and during a remaining time, $\frac{1}{3} V_{ap}$ amplitude AC pulses as shown in waveforms of FIGS. 12–17 are applied between the display and scanning electrodes.

Figure 20:
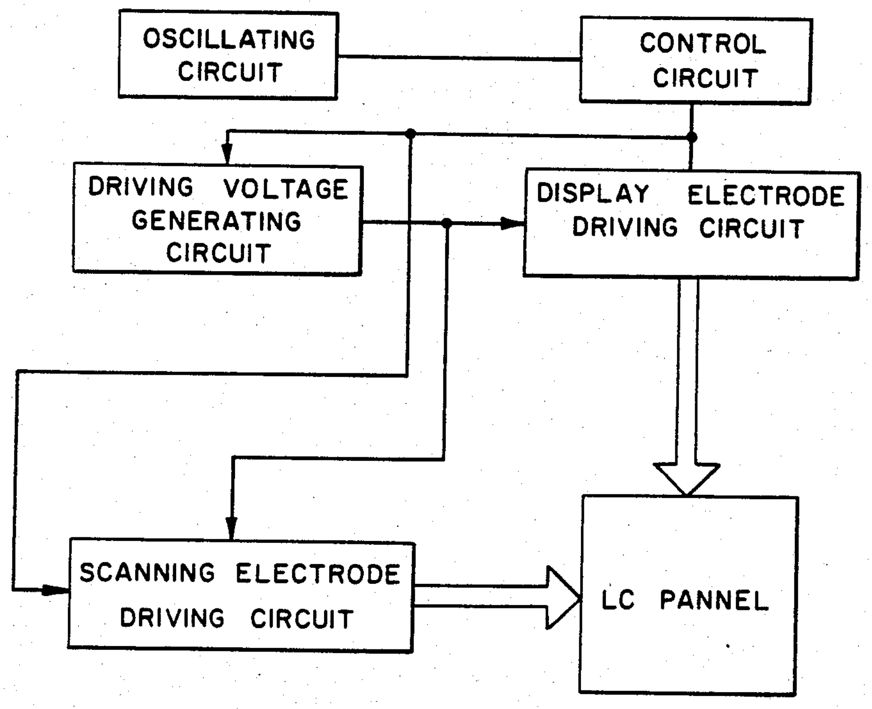
FIG. 20 is a block diagram of a display device of the present invention.
Figure 21:
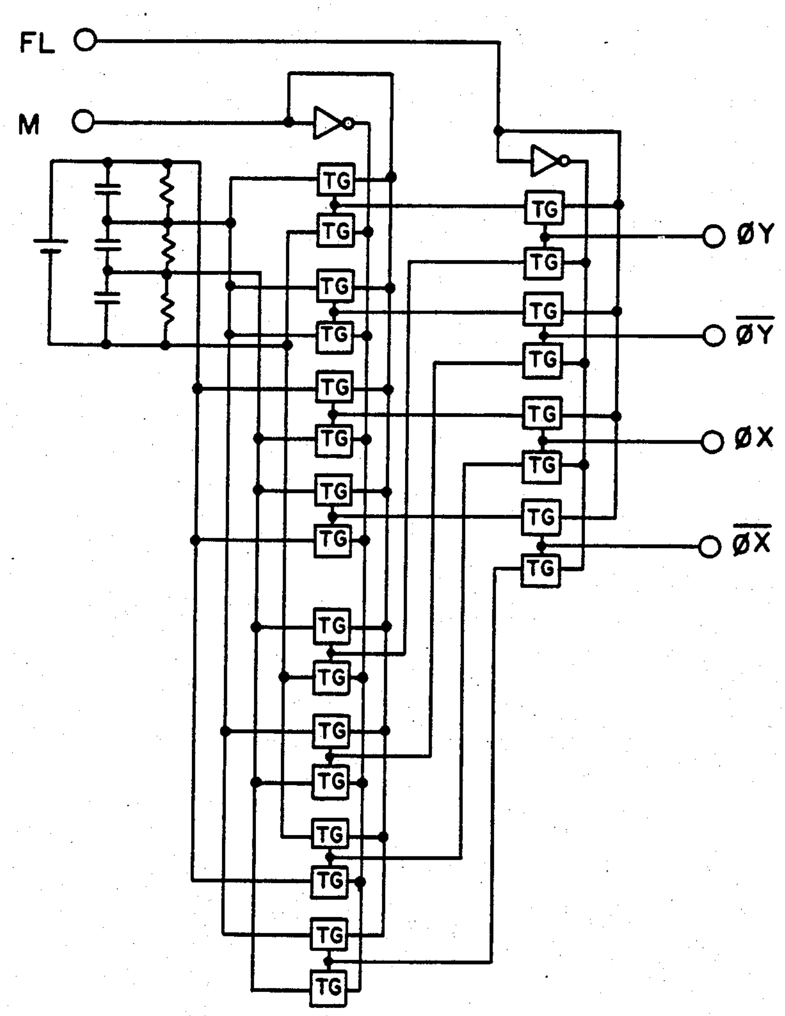
FIG. 21 shows one embodiment of a driving voltage generating circuit in the block diagram of FIG. 20.
Figure 22:
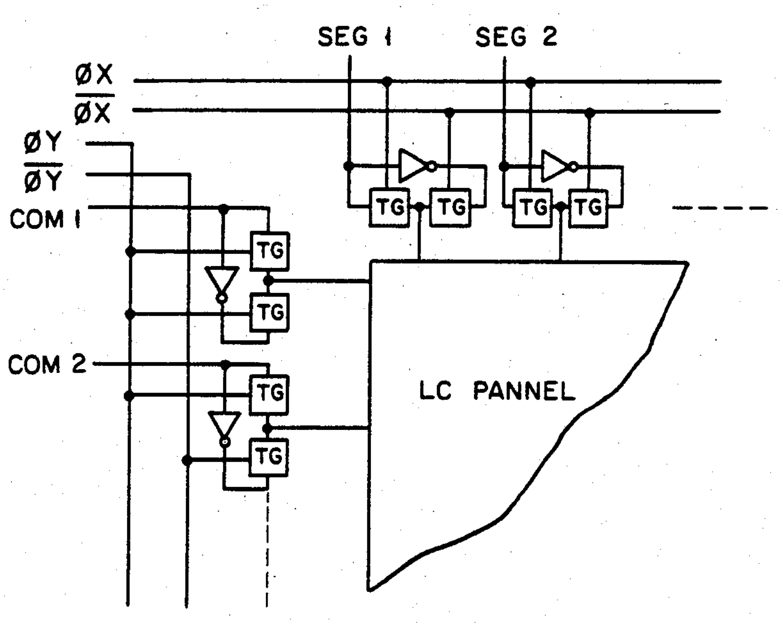
FIG. 22 shows a circuit construction of a driving circuit and a scanning electrode driving circuit in the block diagram of FIG. 20.

Referring now to a circuit construction of driving method of the invention, FIG. 20 shows one embodiment of circuit for a LC display device composed of an OSC circuit, a control circuit, a driving voltage generating circuit, a display electrode driving circuit, a scanning electrode driving circuit and an LC panel. FIGS. 21 and 22 show a detailed construction of the driving voltage generating circuit, display electrode driving circuit and scanning electrode driving circuit. FIGS. 21 and 22 show transmission gates as an analogue switch.

The driving voltage generating circuit shown in FIG. 21 generates the voltage waveforms in FIGS. 12 and 15, and further combines them to produce $\phi Y$, $\overline{\phi Y}$, $\phi X$ and $\overline{\phi X}$ shown in FIG. 18.

A signal M is a driving signal which is produced by the control circuit. The voltage waveform in FIGS. 12 and 15 are produced by transmission gate switches via the driving signal M, and after that, the $\phi Y$, $\overline{\phi Y}$, $\phi X$ and $\overline{\phi X}$ are shaped by switching the driving signals in FIG. 15 according to a scanning switching signal FL distinguishing the first and second scannings.

Figure 23:
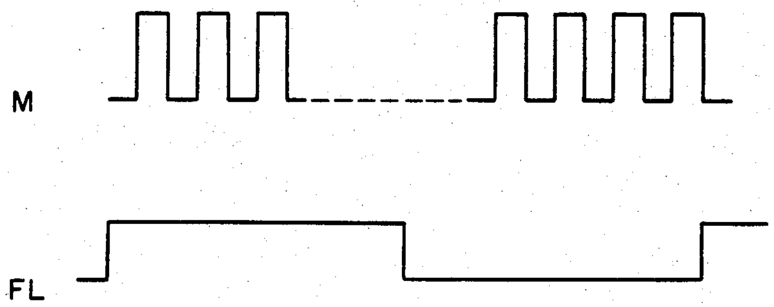
FIG. 23 shows a tiime chart of a control signal for controlling the driving voltage generating circuit in FIG. 21.

FIG. 23 shows a timing chart of the driving signal M and scanning switching signal FL.

FIG. 22 shows one embodiment of the driving circuit for applying the $\phi Y$, $\overline{\phi Y}$, $\phi X$ and $\overline{\phi X}$ according to scanning signals COM-1 and COM-2 and display data signals SEG-1 and SEG-2 to the scanning electrodes and display electrodes of the LC panel. The driving circuit is constructed by a transmission gate for applying $\pm V_{ap}$ to a scanning electrode during a half time when that scanning electrode is selected, and after that, generally, $1/N\ V_{ap}$ amplitude AC pulse signal is applied thereto.

Figure 24:
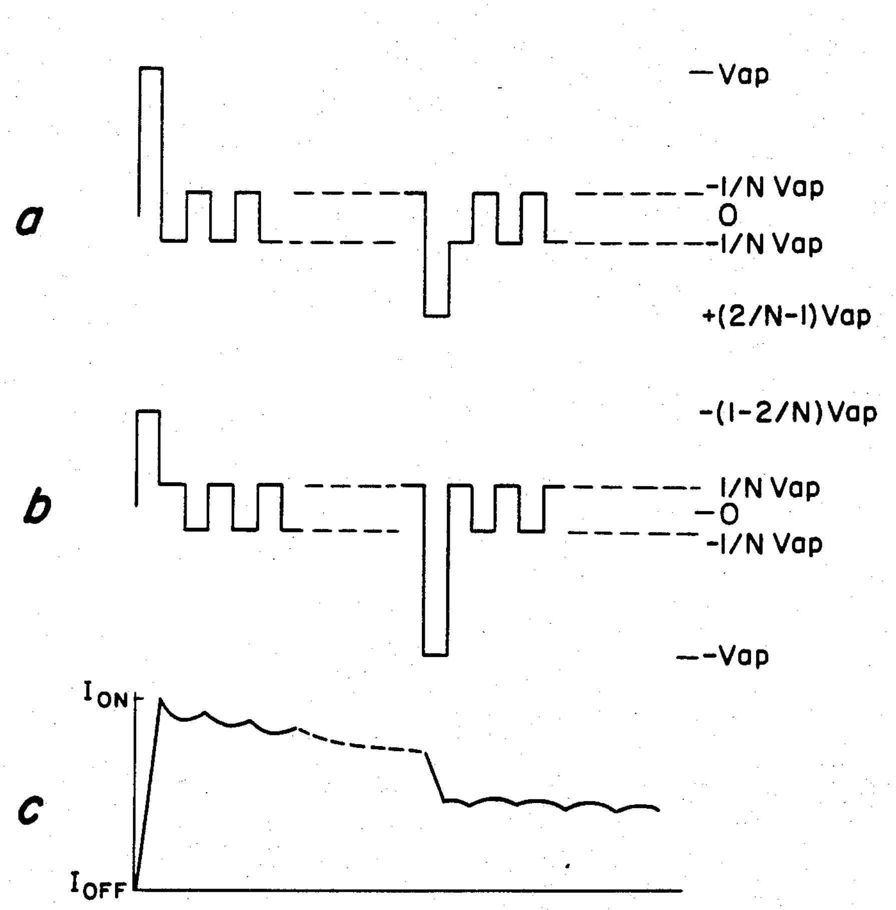
FIG. 24 shows a driving waveform for LC to which $\pm 1/N\ V_{ap}$ AC pulse is applied in a non-selecting period according to the first driving method.

In FIG. 24, waveforms a and b show driving waveforms for LC in accordance with a general driving method in which $1/N\ V_{ap}$ amplitude AC pulses are applied to non-selected picture elements when the scanning signal is low level. On the other hand, as shown by the waveform "a" of FIG. 24, $(2/N-1)V_{ap}$ voltage is applied to a selected picture element in a half of the selected time when it is selected by a scanning signal in the second scanning. Similarly, as shown by the waveform "b" of FIG. 24 $(1-2/N)V_{ap}$ voltage is applied to a selected picture element in a half of selected time when it is selected by a scanning signal.

Accordingly, LC molecule moves toward "a" and "a'" positions of FIG. 9 by $\pm V_{ap}$ high voltage, and after that, AC pulses of $1/N\ V_{ap}$ amplitude is appied whereby a display condition is kept. The display is kept in good condition by a large N and small amplitude of AC pulse signal, and the focusing optical transparent intensity approaches $I_{ON}$. These phenomenon is preferable for a display. But, $(1-1/N)V_{ap}$ voltage is applied to a picture element in a selecting condition (semi-selection) in response to the scanning signal instead of $\pm V_{ap}$, and the polarity thereof is opposite to $\pm V_{ap}$.

The molecules moves toward an opposite position in response to $\pm(1-2/N)V_{ap}$ voltage pulse in the semi-selecting condition.

In case of driving LC by the driving waveform "a", the optical transparent intensity is shown by a curve "c" of FIG. 24, and N is preferably selected according to LC material and alignment.

[Another embodiment]

Another line sequential driving method or time-sharing method from the afore-mentioned driving method is explained as follows.

The feature of this embodiment is to apply a liquid crystal operating pulse voltage having a reverse polarity in the first half of an electrode selecting period and a normal polarity in the latter half of the period.

In non-selecting condition, an A.C. pulse voltage is applied to the liquid crystal. The A.C. pulse voltage has a pulse amplitude and a pulse width at least one of which is less than that of the liquid crystal operating voltage. An embodiment of the circuit to realize the pulse driving method is shown in FIGS. 25 and 26.

Figure 25:
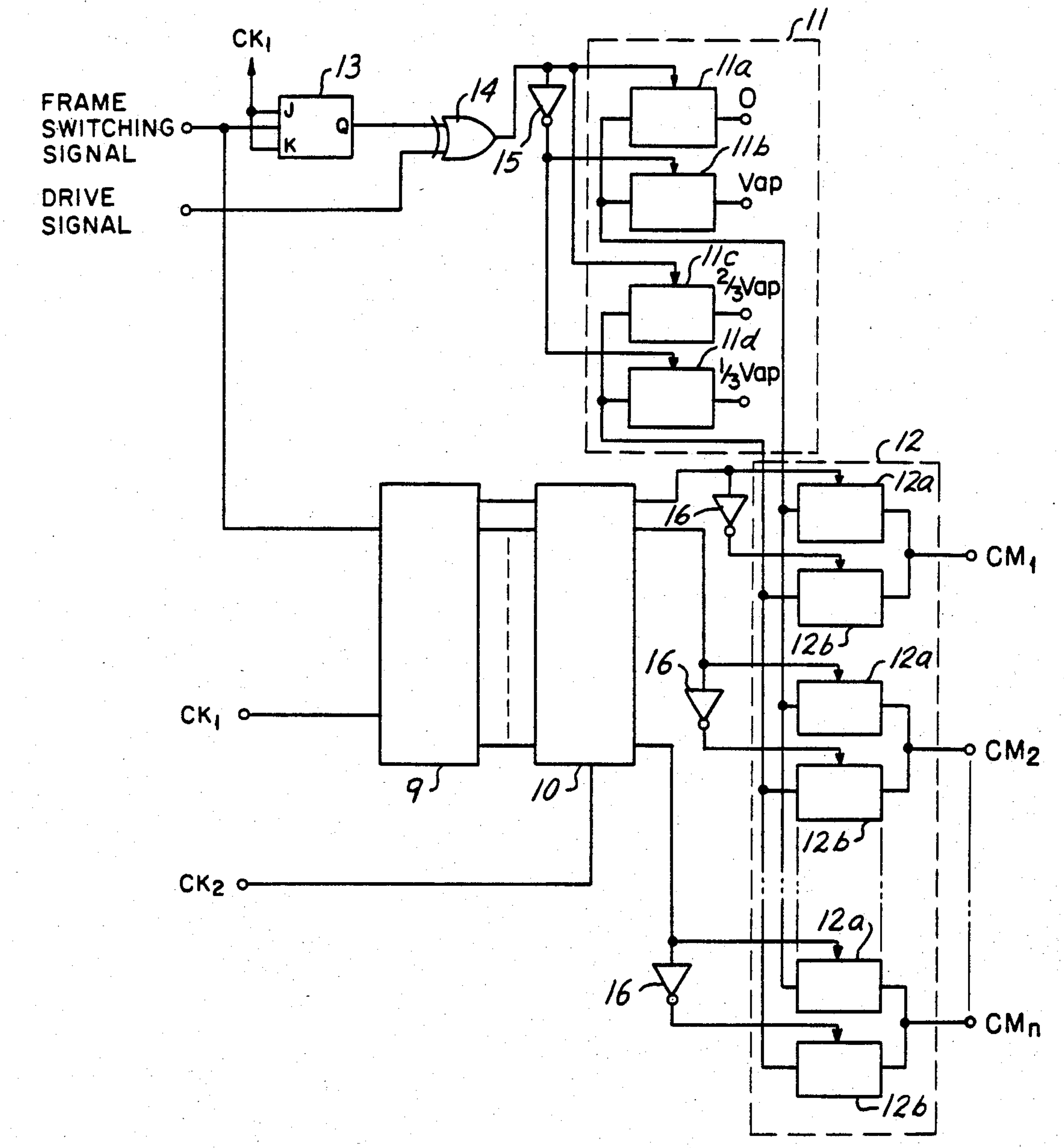
FIGS. 25 and 26 show the block diagrams of one embodiment of a common electrode drive circuit and a segment electrode drive circuit of the LC display device.

FIG. 25 shows an embodiment of a common electrode drive circuit, numeral 9 is a shift register which shifts a frame scanning switching signal $CK_1$ by a clock signal synchronized to a common electrode scanning speed. Numeral 10 is a latch circuit which latches a signal from the shift register 9 in synchronization with a clock signal $CK_2$ and supplies a drive voltage from an operation voltage generating circuit 11 to a plurality of common electrodes $CM_1$, $CM_2$ . . . $CM_n$ via an output gate circuit 12. Numeral 11 represents the drive voltage generating circuit in which LC drive voltages $V_{ap}$, $\frac{2}{3}V_{ap}$ and D voltage from a power source (not shown) are received via analogue switches 11*a*, 11*b*, 11*c* and 11*d* such as transmission gates, analogue switches 11*a* and 11*b* receive LC drive voltage $V_{ap}$ and 0 voltage and the analogue switches 11*c* and 11*d* receive $\frac{2}{3}V_{ap}$ and $\frac{1}{3}V_{ap}$. All of these voltages are applied to the output gate 12 as a pair of signals.

Numeral 13 is a frame scanning switching signal divider which is composed of a J-K flip flop and which generates a frame scanning switching signal by a clock signal $CK_1$ synchronized to a common electrode scanning speed. Numeral 14 is an EX-OR gate to which a signal from the frame switching signal divider 13 and a drive signal are applied, a phase of the drive signal is reversed by application of a scanning signal, and 0 voltage and $\frac{2}{3}V_{ap}$ or $V_{ap}$ and $\frac{1}{3}V_{ap}$ are generated from drive voltage generating circuit 11 by applying an output signal of the EX-OR gate 14 to control terminals of the analogue switches 11*a*, 11*b*, 11*c* and 11*d* directly or indirectly via an inverter 15. Numeral 12 is the output gate circuit having a plurality of a pair of analogue switches 12*a* and 12*b* which receive an output signal from the drive voltage generating circuit 11. The output signal from the latch circuit 10 is directly applied to one analogue switch 12*a* and is applied to another switch 12*b* after reversed by inverters 16.

Figure 26:
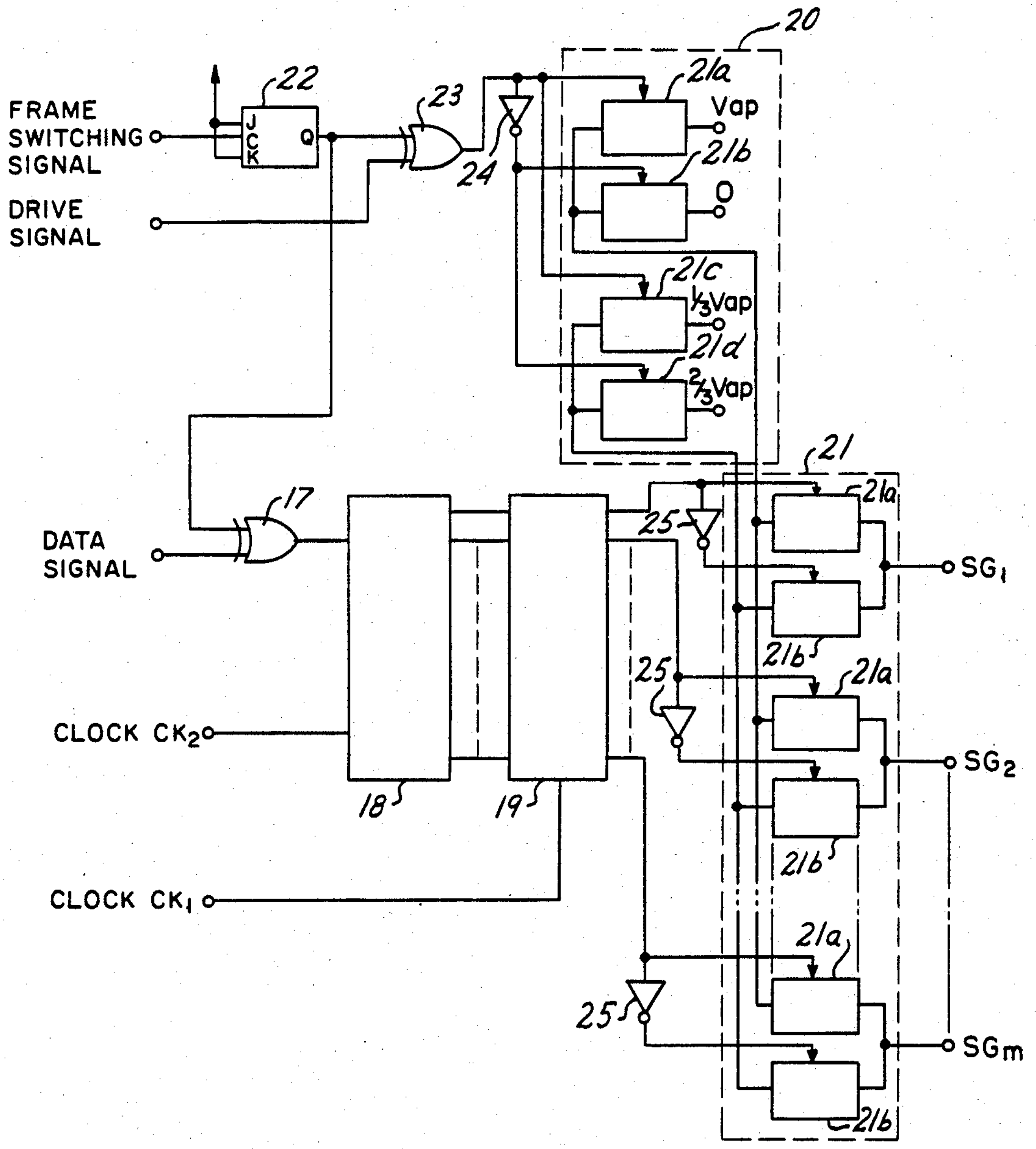

FIG. 26 shows an embodiment of a segment electrode drive circuit. Numeral 17 is an EX-OR gate to which a frame switching signal and a data signal are applied and which reverses the date signal when the frame switching signal is applied thereto. Numeral 18 is a shift register to which the data signal from the EX-OR gate 17 and a segment electrode scanning timing signal, i.e., subscanning clock $CK_2$ are applied and which shifts the data signal by the clock $CK_2$. Numeral 19 is a latch circuit which latches a signal from the shift register 18 in synchronization with the clock signal CK, and operates to supply a drive voltage fed from a drive voltage generating circuit 20 to a plurality of segment electrodes $SG_1$, $SG_2$ . . . $SG_n$ via an output gate circuit 21. Numeral 20 is the drive voltage generating circuit to which a plurality of liquid crystal drive voltages $V_{ap}$, $\frac{2}{3}V_{ap}$, $\frac{1}{3}V_{ap}$ and 0 voltage from a power source (not shown) are applied via analogue switches 20*a*, 20*b*, 20*c* and 20*d* and which supplies output signals of the analogue switches 20*a* and 20*b* which receive a LC drive voltage $V_{ap}$ and 0 voltage, and supplies output signals of the analogue switches 20c and 20d which receive $\frac{2}{3} V_{ap}$ and $\frac{1}{3} V_{ap}$ to the output gate circuit 21 as a pair. Numeral 22 is a frame signal divider which is composed of a J-K flipflop and which separately generates a frame signal synchronized to the frame switching signal. Numeral 23 is an EX-OR gate to which a signal from the frame switching signal divider 22 and a drive signal are applied and which reverses a phase of the drive signal. 0 voltage and $\frac{2}{3} V_{ap}$ or $V_{ap}$ and $\frac{1}{3} V_{ap}$ are fed from the drive voltage circuit 20 in response to an output signal of the EX-OR gate 23 to control terminals of the analogue switches 21a, 21b, 21c and 21d directly or indirectly via an inverter. Numeral 21 is the output gate circuit having a plurality of a pair of analogue switches 21a and 21b which receives an output signal from the drive voltage generating circuit 20, and an output signal from the latch circuit 19 is directly applied to one analogue switch 21a and is applied to another switch 21b after reversed by inverters 25.

Figure 27:
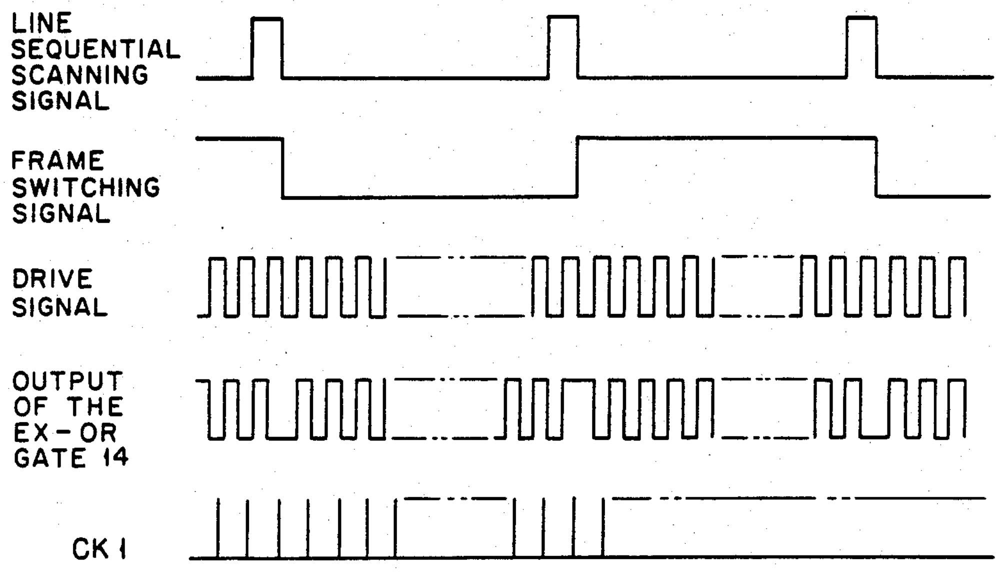
FIGS. 27 and 28 show the wave forms of operation of the device.
Figure 28:
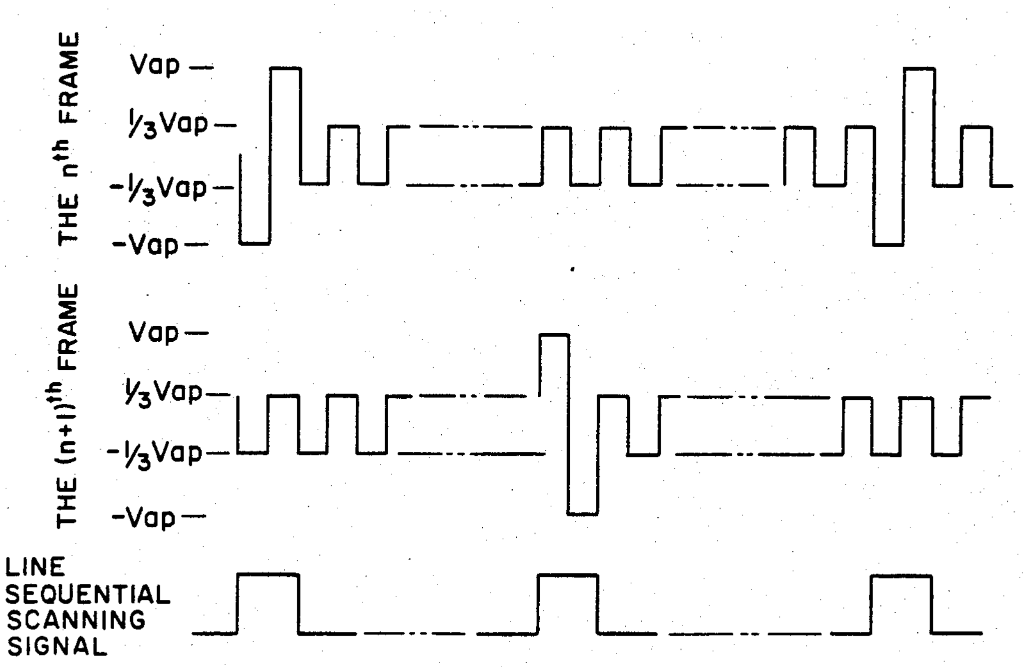

Referring now to an operation of the embodiment in conjunction with FIGS. 27 and 28:

When the frame switching signal is generated, it is latched by the latch circuit 10 via the shift register 9 whereby a first common electrode $CM_1$ becomes a selected condition, and another common electrodes $CM_2$ . . . $CM_n$ become a non-selected condition.

On the other hand, the frame switching signal is changed to a signal synchronized to the common electrode switching clock by the frame signal dividing circuit 13 and applied to the EX-OR gate 14. The drive signal which is applied to the EX-OR gate 14 is applied the drive voltage generating circuit 11 after a phase thereof was reversed. According to the reversed condition, $V_{ap}$ is applied to the common electrode $CM_1$ so that LC operating voltage $V_{ap}$ opposite to a writing density is applied during the first half duration of a line sequential scanning signal to a selected picture element, and 0 voltage is applied to the common electrode $CM_1$ so that LC operating voltage $+V_{ap}$ having a forward polarity preferable for the writing density is applied during the latter half duration of the line sequential scanning signal to the selected picture element. In the above description, an electric potential of the picture element is measured relative to the common electrode to simplify the explanation. During a frame scanning operation after the writing operation is finished, an alternating voltage has an amplitude about $\frac{1}{3}$ of the liquid crystal drive voltage $V_{ap}$ and synchronizes the drive signal is applied to the picture element.

On the other hand, in the segment electrode drive circuit as shown in FIG. 26, a phase of the data signal is reversed by the EX-OR gate 17 and the reversed data signal is applied to the shift register 18. A phase of the data signal which is applied to the EX-OR gate is reversed by the line sequential scanning signal and thereafter the data signal is applied to the output gate 21. By the reversed condition, $V_{ap}$ and 0 electric potential are applied to the segment electrode so that LC operating voltage $-V_{ap}$ of the reverse direction during the firt half duration of the line sequential scanning signal and LC operating voltage $+V_{ap}$ of the forward direction during the latter half duration of the line sequential scanning signal operate the selected picture element, and after that, $-\frac{1}{3} V_{ap}$ and $\frac{2}{3} V_{ap}$ are applied preferably thereto so that an alternating voltage which has an amplitude about $\frac{1}{3}$ of LC drive voltage $V_{ap}$ and a frequency of which synchronizes an alternating clock is applied to the picture element in the frame during the frame scanning.

Namely, a minus electric field is applied to a selected picture element held in either bright or dark condition on the first common electrode during the first half duration of the line sequential scanning signal, to temporarily reset the condition of the picture element to the dark condition and a plus electric field is applied to the same picture element during the second half duration of the line sequential scanning signal so that the temporarily reset dark condition of the picture element is switched to the bright condition to effect writing of the picture element. According to the process, electric fields of both of plus and minus directions of LC operating voltage are successively applied to the same picture element, so that LC of the picture element does not store up an electric charge. Further, after that writing operation is finished, 1/N of LC drive voltage, i.e., $\frac{1}{3} V_{ap}$ which exceeds a threshold voltage Vth of the smectic LC, is applied to the picture element using the 1/N bias method, the alternating electric field being effective to keep dynamically LC molecules at a center of "b" position which is deviated from the molecular position "a" of LC which is once selected as indicated in FIG. 9. As noted above, a first scanning operation for all of common electrodes is finished, a writing operation for a dark condition starts during a second frame scanning.

Namely, a plus electric field which is an electric field of reverse direction against a necessary electric field is applied to a selected picture element held in either dark or bright condition on the first common electrode during the first half duration of the line sequential scanning signal to temporarily reset the condition of the picture element to the bright condition, and thereafter a minus electric field is applied to the same picture element during the second half duration of the line sequential scanning signal so that the temporarily reset bright condition of the picture element is switched to the dark condition to effect writing of the picture element. Further, a period and intensity of plus and minus electric fields which are applied during a selecting condition is set to a value so that LC molecules can substantially respond thereto.

As above noted, in the process, plus and minus electric fields are successively applied to a picture element so that the picture element does not store up an electric charge. According to this condition, after writing operation is finished, an alternating voltage of $\frac{1}{3}$ of the LC drive voltage $V_{ap}$ is applied to the picture element, whereby the picture element can keep dynamically the selected dark condition.

In the above noted embodiment, smectic LC panel is driven by $\frac{1}{3}$ averaging method, however this invention is not limited to this embodiment.

Figure 29:
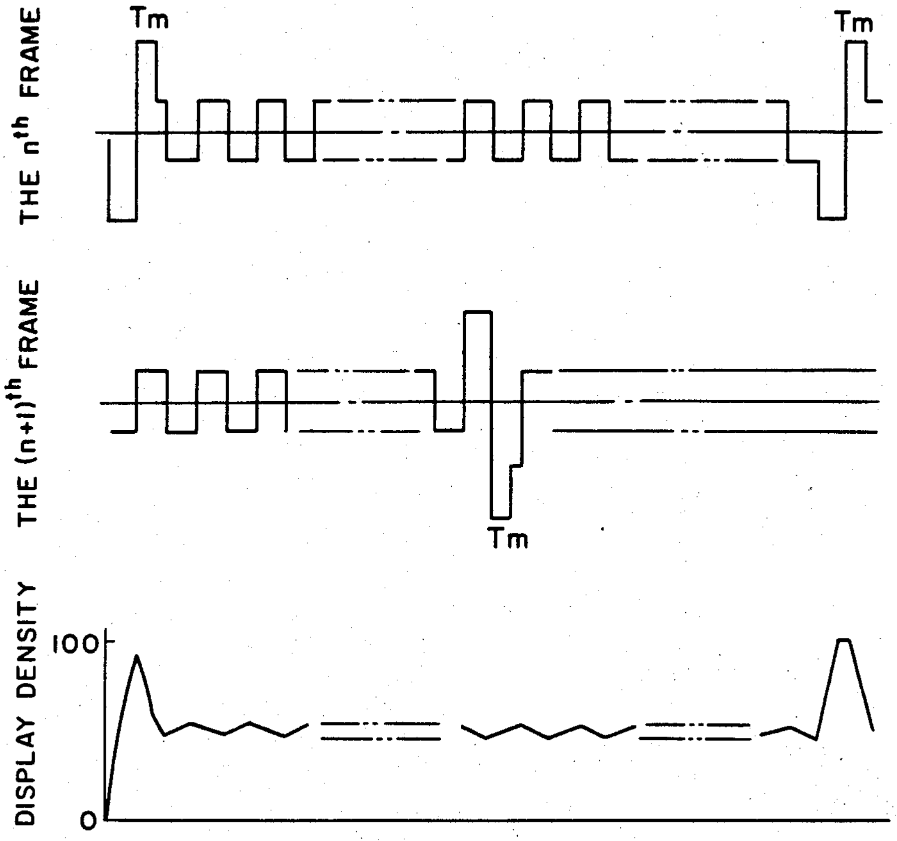
FIG. 29 shows a waveform of another embodiment.

FIG. 29 shows another embodiment of the present invention. A pulse width Tm of the writing signal is modulated by the data signal according to a display density. In this embodiment, it is possible to execute a tone or graduated display by using an excess response characteristic (shown in FIG. 11).

According to the present invention, a pair of base plates on which scanning electrodes and alignment membranes are formed are opposed so that the alignment membranes are opposed inwardly. A smectic liquid crystal compound is inserted between a gap of the base plates which is limited less than a spiral pitch of the liquid crystal compound. A LC operating voltage pulse of the reverse direction is applied to a picture element to temporarily reset the display condition thereof during the first half duration of the electrode selecting period, and a operating voltage pulse of the forward direction is applied thereto during the latter half duration of the electrode selecting period to write new display condition in the reset picture element, whereby it is able to attain an increase of LC life and display performance by eliminating a generation of remained charge in LC panel when the writing is executed. Further, an alternating voltage during non-selecting period is applied to the picture elements, whereby the display condition or state is dinamically maintained, and there is no fear for unnecessarily changing the display condition during the non-selecting period in spite of a low threshold voltage of smectic LC molecule. It is able to adopt 1/N average bias method whereby time-sharing dynamic display is performed. Accordingly, S m C* is driven by the waveforms.

The LC molecule rotates to "a" or "a'" position of FIG. 9 or approaches position when a positive or negative $V_{ap}$ is applied to the picture element on a selected scanning electrode, whereby the dark and bright display states reach the highest level. After that, the optical transparent ratio of the dark and bright conditions are declines with vibration, and the declining amount is the greatest just after the equal positive and negative AC pulses is applied thereto, and after that, it is not changed.

In case of many time-sharing system, a selecting time assigned to one scanning electrode becomes shorter than non-selecting time assigned thereto. For example, in case of 1/n duty driving method, a time $t_1$ for selecting one scanning electrode during one frame time $t_0$ is $t_1=t_0/n$, further, non-selecting time is $t_2=[(N-1)t_0]/n$.

The optical transparent ratio when AC pulses are applied to the picture element during the non-selecting time is vibrated, but, its amount is not almost changed. This condition almost dominates the display state throughout the frame time and is acknowledged by man's eyes as a contrast of the picture element, whereby the contrast is almost constant independently of the duty ratio.

According to our measurement, the contrast is almost constant in the display ½ to 1/256 duty.

This phenomenon of S m C* is very preferable for time-sharing display comparing with TN-typed LC display panel in which the contrast becomes lower according to the sharing number because an actual voltage has not difference between the selecting and non-selecting points. If a response of S m C* is 10 μsec, the sharing number thereof is as follows:

$$n=[30{,}000(\mu sec)]/[10\times 2(\mu sec)]=1500$$

But it is necessary to provide 30 msec for one frame operation, number 2 represents a number of a positive and a negative voltages applied during the selecting time.

It is possible to drive LC panel by 1/1500 duty-driving system if the LC panel can respond to maximum speed at present, further it is possible to keep a constant contrast between ½ and 1/1500 duty system according to the method of the present invention.

Referring now to a supreme contrast characteristic of the present invention:

If a cell gap becomes thinner up to about 1 μm, the S m C* loses a spiral construction so that the layer is aligned so as to be vertical to the base plate as aforementioned, namely the LC molecules are aligned horizontally to the base plate. In case of the driving method, according to the invention the bi-stably aligned molecules are selectively held at positions "b" and "b'" near "a" and "a'" of FIG. 9, and the molecules are similarly positioned horizontal to the base plate. Therefore, there is no contrast change since molecules are positioned horizontal to the base plate. This condition corresponds to a cross talk condition in non-lighting condition of TNLC display panel, and this phenomenon is a characteristic dependent on viewing angle as well known.

S m C* display of the invention has epoch-making characteristics which is independent of not only viewing angle but also duty ratio in respect to the contrast.

Figure 30:
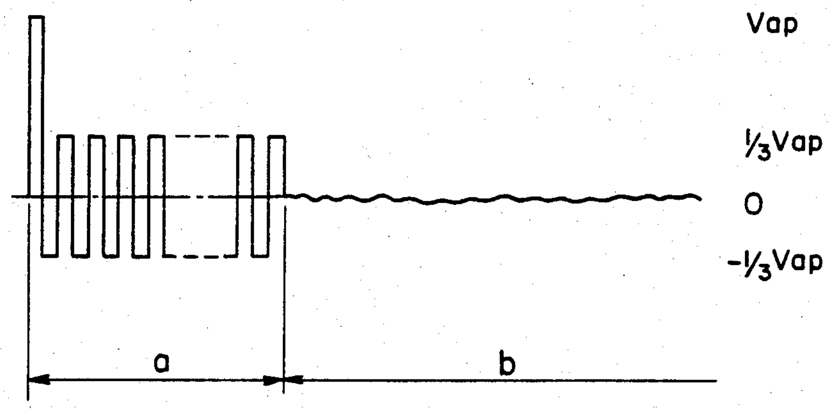
FIGS. 30–32 show waveforms of voltage signals applied to LC in case of using the driving methods of a complete AC pulse application, wherein a change to high frequency and floating operation after several scanning are carried out.
Figure 31:
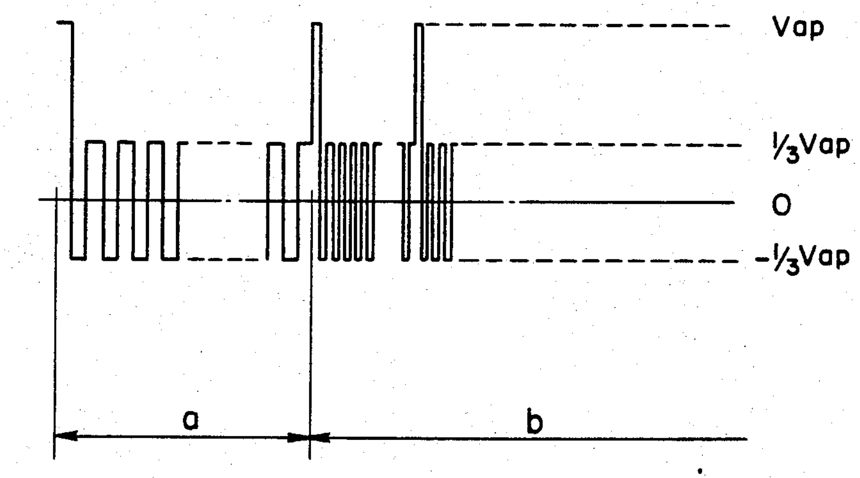

Referring now to one embodiment of the present invention accompanying with FIG. 30:

The driving waveform shows the change of the voltage applied to the liquid crystal, in case that a display state is held by making the driving circuit high impedance condition, after the display state is written by scanning one or several times using the three types driving waveforms. In FIG. 30, "a" designates a scanning period and, "b" designates a period of high impedance condition. In this high impedance condition the liquid crystal molecules stay in "b" and "b'" positions of FIG. 9 and the optical transparent ratio is not changed in the high impedance condition. This memory characteristic is substantially long-lasting and the scanning is performed only when the display changes. A power consumption in the high impedance condition is zero to save energy and, further, this driving method is preferably for a stationary image display. FIG. 31 shows another embodiment of drive waveforms similar to the driving method of high impedance type of FIG. 30. The display is held by increasing a driving frequency after one or several scanning operation.

The driving method shown in FIG. 30 for memorizing a display condition by the high impedance gradually restores the molecular condition to the initial alignment condition after the outer controlling power of the applied voltage is removed.

The driving method shown in FIG. 31 provides excellent memory characteristics to the display in comparison with the method of FIG. 30.

This phenomenon that the molecule turns to the initial alignment condition in the high impedance is affected by a strong alignment power and high temperature. Particularly, the phenomenon is affected by temperature powerfully, therefore, the display drive method of increasing a driving frequency as shown in FIG. 31 is more preferable.

The driving method of FIG. 31, is usually performed by increasing the driving frequency. A display data is fed from the display electrode side, or determined in a lighting or non-lighting condition.

Figure 32:
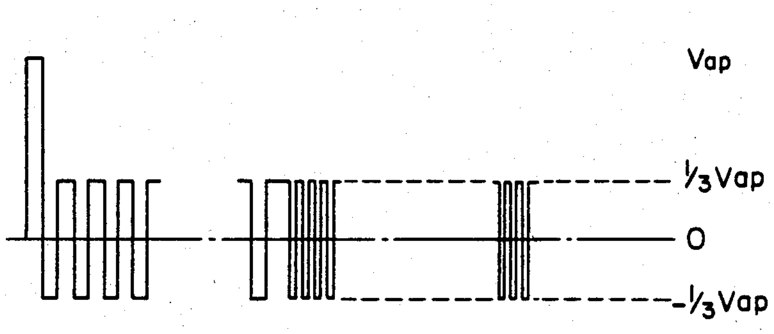

Referred now to further embodiment of FIG. 32 similar to FIG. 31.

A different point from FIG. 31 is that AC pulses having positive voltage and a negative voltage are applied to a picture element in non-selecting condition, and after one or several scanning, has been carried out different voltage AC pulses are applied thereto, whereby the display state is kept. In this case, the frequency is preferably selected.

Figure 33:
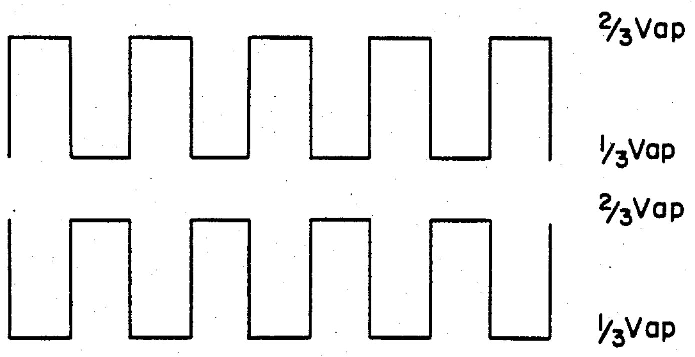
FIG. 33 shows waveforms which are applied to common and segment electrodes after several scanning in FIG. 32.
Figure 34:
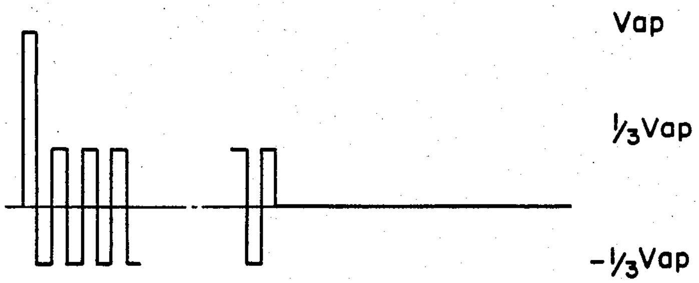
FIG. 34 shows a voltage signal for LC in case of using the driving method which gives zero voltage to LC after several scannings.

FIG. 32 shows a waveform when ±½ $V_{ap}$ AC pulses are applied to picture element. In this embodiment, a driving waveform which is applied to scanning and display electrodes after scanning becomes a waveform having a different phase and an amplitude as shown in FIG. 33. In this case, the scanning of the scanning electrode is not performed. One waveform of FIG. 33 is applied to the scanning electrodes, and another waveform of FIG. 33 is applied to the display electrodes independently of display data.

Referring now to one embodiment of a driving method for obtaining a tone or gradated display:

A basic method for the tone display generates a half tone display by modulating the $\pm V_{ap}$ pulse width which is applied to a picture element on the selected scanning electrode. As to a change of optical transparent ratio in a driving condition, the maximum level of the dark and bright conditions is obtained when the selecting voltage $\pm V_{ap}$ is applied the picture element. When the pulse width of the $\pm V_{ap}$ pulse is reduced, the optical transparent ratio obtained by the application of the pulse-width-reduced pulses is proportionally reduced as compared to the optical transparent ratio when the selecting voltage $\pm V_{ap}$ is applied to the picture element.

According to this phenomenon, it is able to obtain the tone display by adjusting the optical transparent ratio in a selecting condition. Therefore, it is able to obtain the optical transparent ratio which is proportional to a pulse width of the selecting voltage $\pm V_{ap}$ and to obtain the tone display. FIGS. 37–40 show the driving waveform thereof.

Figure 35:
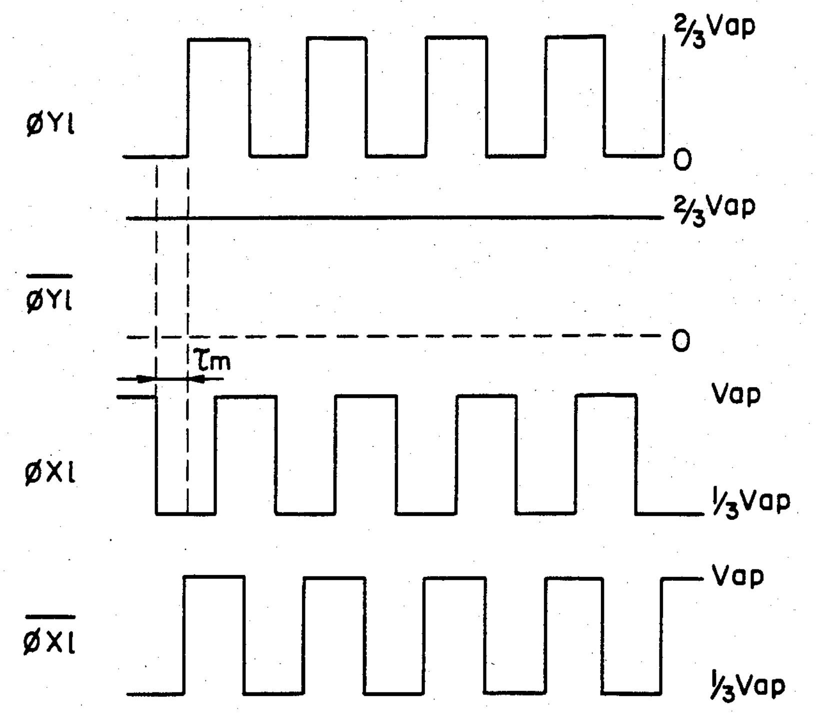
FIGS. 35–40 show embodiments of basic signals in which $\pm\frac{1}{3}\ V_{ap}$ AC pulse is applied during a non-selecting period and the gradated display is performed by modulating the selecting voltage $V_{ap}$.

FIG. 35 shows a waveform embodiment in which the scanning waveform is changed to carry out the tone display. The suffix "1" corresponds to the same suffix shown in FIG. 12. A difference between FIGS. 35 and 12 is only the segment signal, and another signal is same. In the embodiment, the selecting voltage $V_{ap}$ is modulated by shifting the phase in $\tau m$, and the pulse width $\tau ap$ for the selecting voltage is as follows:

$$\tau ap = \tfrac{1}{2}f - \tau m$$

It is able to perform a tone display by adjusting $\tau m$ according to the half-tone level.

Figure 36:
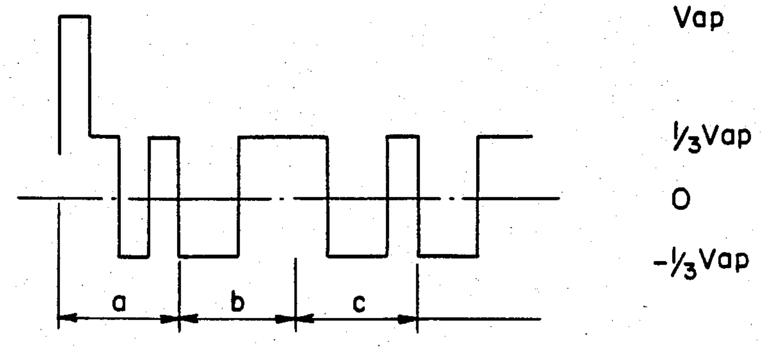

FIG. 36 shows one example in which a voltage is applied to LC from the signals in FIG. 35.

FIG. 36, "a" shows a waveform for LC when the scanning electrode is selected and the selecting signal is applied to the display electrode, "b" shows a waveform for LC when the non-selecting signal is applied to the display electrode and the scanning electrode is not selected, "c" shows a waveform for LC when the selecting signal is applied to the display electrode and the scanning electrode is not selected. As to "b" and "c", time for $\pm\frac{1}{3} V_{ap}$ is considered to be equal each other.

Figure 37:
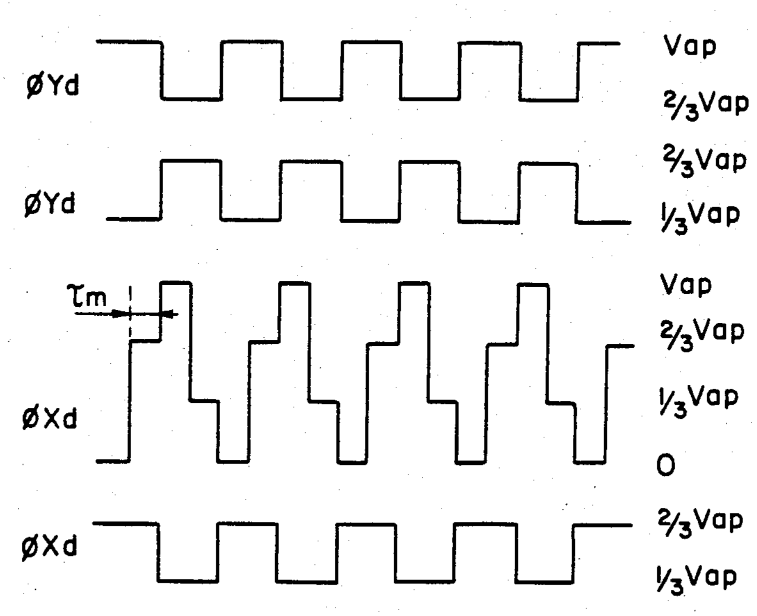

FIG. 37 shows a waveform in which a non-lighting scanning signal shown in FIG. 16 is changed to carry out the tone display as same to FIG. 35. A different point from FIG. 35 is that the segment selecting signal is formed as stepping shape, the selecting voltage $-V_{ap}$ for LC is narrowed in $\tau m$ pulse width, whereby the tone display is performed by adjusting the $\tau m$ according to the half-tone level.

Figure 38:
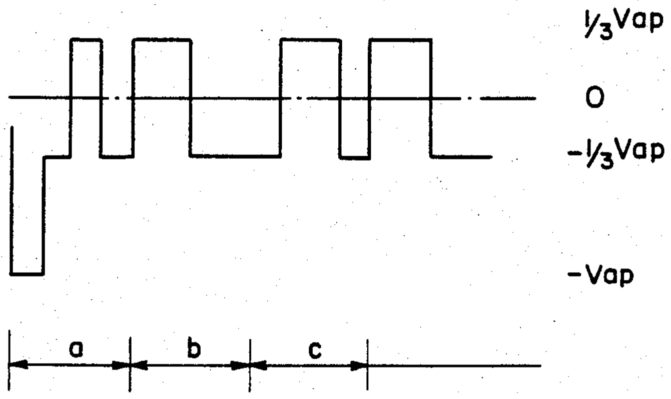
Figure 39:
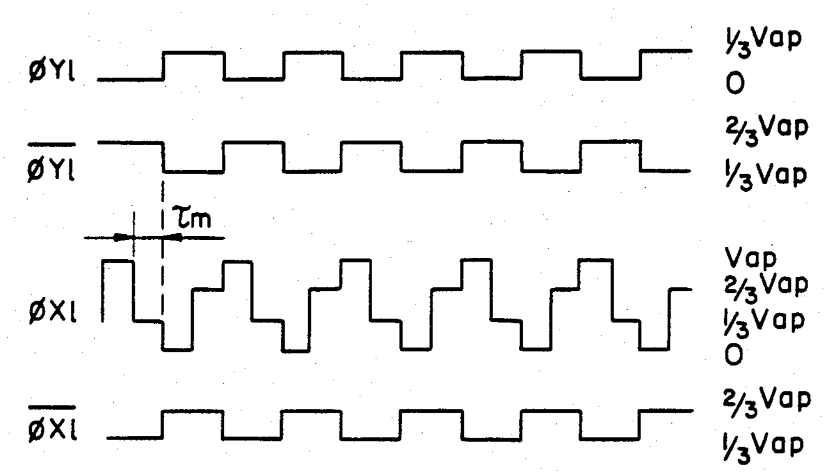
Figure 40:
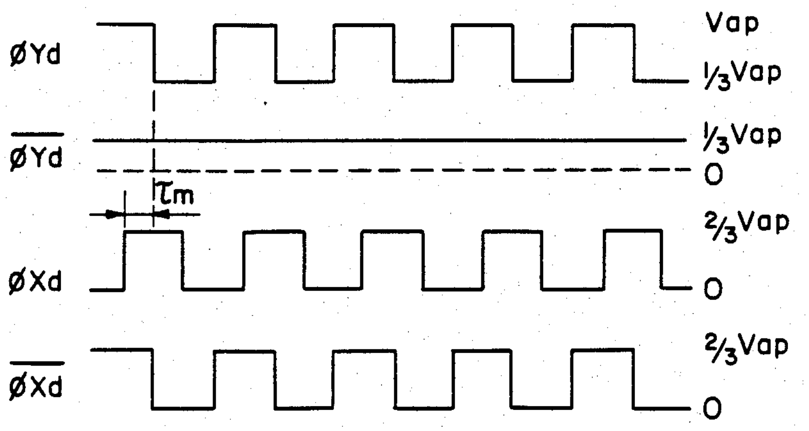

FIG. 38 shows the waveform for LC same as to FIG. 36, "a", "b" and "c" in FIG. 38 show a same condition as to FIG. 36, i.e., the same to the contrary polarity of waveform in FIG. 36. Namely, (1) Shifting the phase, and (2) Forming stepping waveform.

Figure 41:
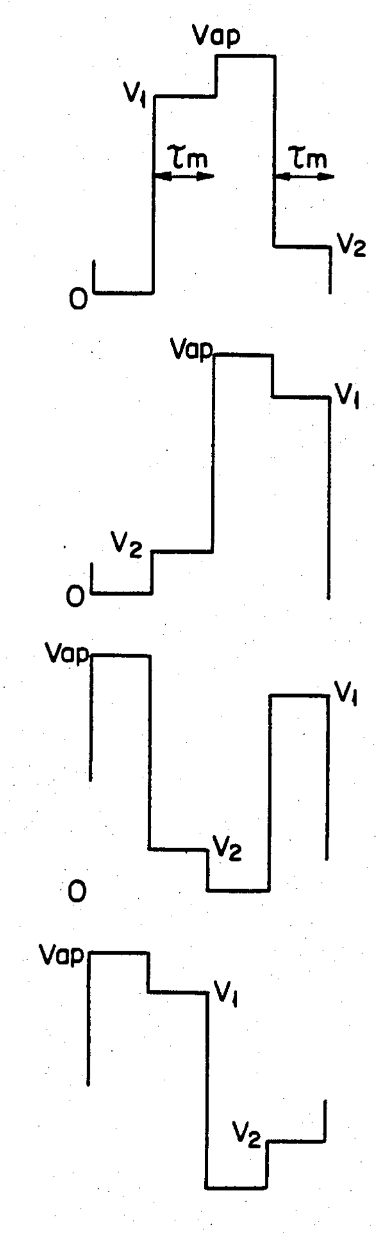
FIG. 41 shows a changing pattern of a segment selecting signal which be changed for the gradated display.

FIG. 41 shows one embodiment of forming stepping waveform, which shows a lighting condition about upper two and non-lighting condition about lower two.

$V_1$ and $V_2$ are the voltage as follows:

$$V_1 = \{1-(2/a)V_{ap}\}$$

$$V_2 = (2/a)V_{ap}$$

"a" is a preferable number, $\pm(1/a)\ V_{ap}$ AC pulse is applied thereto in non-selecting condition, a temperature compensation is possible in these methods.

Figure 42:
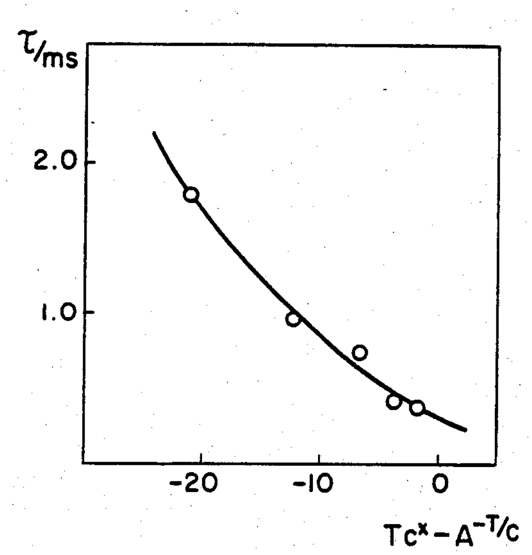
FIG. 42 shows a relation between a response time and a temperature of ferro-electric LC.

FIG. 42 shows a temperature change of response time which is simply declined according to a elevation of temperature. If a temperature is elevated and a response time becomes shorter, a sufficient response is performed by non-selecting AC pulse voltage and pulse time width in case of a driving voltage or frequency which is kept in low temperature, whereby a memory characteristic becomes worse. This condition is recognized as a flicker to man's eye.

As to a temperature compensation, the driving voltage and frequency are set to be able to display in a low temperature, and further the frequency is controlled according to an elevated temperature, whereby a temperature compensation is attained, and it is able to control the temperature compensation by a voltage, and $V_{ap}$ is adjusted according to a temperature.

The S m C* display device of the present invention is able to overcome a limitation of conventional X−Y matrix LC display device. A time-sharing display is performed by a simple matrix system, whereby it is able to reduce a number of driving IC. Further it is able to obtain LC panel having a large capacity of low price since the panel is a simple one without an active element.

What is claimed is:

1. A liquid crystal display device driven in a time-sharing mode, comprising: a pair of electrodes spaced apart from each other; a ferro-electric liquid crystal layer disposed between the pair of electrodes such that the layer loses a spiral molecular alignment thereof to establish two-bistable molecular alignments thereof; drive means connected between the pair of electrodes for applying an electric signal to the layer sufficient to change one of the two bi-stable molecular alignments to the other bi-stable molecular alignment and for applying an A.C. electric signal to the layer effective to hold the other bi-stable molecular alignment, the A.C. electric signal having an amplitude and a pulse width insufficient to change the bi-stable molecular alignments; and converting means for coverting the two bi-stable molecular alignments to corresponding optical ON and OFF display states, respectively.

2. A liquid crystal display device as claimed in claim 1; wherein the drive means includes means for electrically disconnecting the pair of electrodes after the application of the A.C. electric signal to the layer.

3. A liquid crystal display device as claimed in claim 1; wherein the drive means includes means for changing a driving frequency to compensate for changes in ambient temperature.

4. A liguid crystal display device as claimed in claim 1; wherein the drive means includes means for adjusting the electric signal effective to change the bi-stable molecular alignments to compensate for changes in ambient temperature.

5. A liquid crystal display device as claimed in claim 1; wherein the ferro-electric liquid crystal layer comprises a chiral smectic liquid crystal layer.

6. A liquid crystal display device as claimed in claim 1; wherein the drive means includes means for applying an A.C. electric signal having a high frequency sufficient to avoid the degradation of an optcial transparent intensity of the optical ON display state.

7. A liquid crystal display device as claimed in claim 1; including a liquid crystal panel having display and scanning electrodes in opposed relation to each other to define a matrix electrode structure; and wherein the drive means comprises an oscillating circuit for generating a clock signal, a driving voltage generating circuit for producing a driving voltage waveform, driving circuits for supplying a driving voltage according to the driving voltage waveform to the display electrodes and scanning electrodes, and a control circuit for controlling the driving voltage generating circuit and the driving circuits.

8. A liquid crystal display device as claimed in claim 7; wherein the control circuit has a first exclusive OR circuit for supplying a polarity changeover signal having a phase inverted with the changing ON or OFF to the other state to the driving voltage generating circuit and a second exclusive OR circuit for supplying a data signal having a phase inverted with the changing ON or OFF to the other state to the driving circuit.

9. A liquid crystal display device as claimed in claim 8; wherein the drive means effects a first scanning operation for writing one of the optical ON and OFF display states and a second scanning operation for writing the other of the display states during one frame of operation.

10. A liquid crystal display device as claimed in claim 1; wherein the drive means includes means for applying an A.C. electric signal having no D.C. component.

11. A liquid crystal display device as claimed in claim 1; wherein the ferro-electric liquid crystal has a thickness sufficiently thin to lose the spiral molecular alignment of the layer.

12. A liquid crystal display device as claimed in claim 1; wherein the electric signal comprises an electric voltage signal and the A.C. electric signal comprises an A.C. electric voltage signal.

13. A liquid crystal display device driven in a timesharing mode, comprising; a ferro-electric liquid crystal aligned to establish two bi-stable display states; and drive means for applying a selected voltage $\pm V_{ap}$ having a desired pulse amplitude and a pulse width to the liquid crystal to change one of the two bi-stable display states to the other bi-stable display state and for applying to the liquid crystal an A.C. pulse voltage having a pulse amplitude and a pulse width at least one of which is less than that of the selected voltage $\pm V_{ap}$ to thereby hold the other bi-stable display state.

14. A liquid crystal display device as claimed in claim 13; wherein the drive means includes means for applying a selected voltage $\pm V_{ap}$ containing a D.C. component.

15. A liquid crystal display device as claimed in claim 13; wherein the drive means includes means for applying a selected voltage $\pm V_{ap}$ containing no D.C. component.

16. A liquid crystal display device as claimed in claim 13; wherein the drive means includes means for applying a selected voltage having a polarity effective to change one of the two bi-stable display states to the other bi-stable display state during a first scanning operation and for applying another selected voltage having another polarity effective to change the other bi-stable display state to said one bi-stable display state during a second scanning operation.

17. A liquid crystal display device as claimed in claim 13; wherein the ferro-electric liquid crystal comprises ferro-electric liquid crystal molecules aligned to assume two bi-stable molecular alignment corresponding to the two bi-stable display states, respectively.

18. A liquid crystal display device as claimed in claim 13; wherein the drive means includes means for increasing the driving frequency after the drive means carries out a scanning operation for a given number of times.

19. A liquid crystal display device as claimed in claim 13; wherein the drive means includes means for applying to the liquid crystal a selected voltage having a modulated pulse width effective to develop an intermediate display state between the two bi-stable display states.

20. A liquid crystal display device as claimed in claim 13; wherein the drive means includes means for applying a selected voltage signal comprised of a first pulse effective to reset the display state of the liquid cystal to one of the two bi-stable states and a successive second pulse having a opposite polarity effective to change the reset display state to the other bi-stable state.

21. A liquid crystal display device as claimed in claim 13; wherein the drive means includes means for applying to the liquid crystal a selected voltage having a modulated duration effective to develop an intermediate display state between the two bi-stable display states.

22. A liquid crystal display device as claimed in claim 13; wherein the drive means includes means for effecting a first scanning operation for writing one of the two bi-stable display states and for effecting a second scanning operation for writing the other bi-stable display state during one frame of operation.

23. A smectic liquid crystal display device comprising in combination: a liquid crystal panel including a pair of opposed base plates, electrodes disposed on the respective inner surfaces of the opposed base plates, alignment membranes shaped on the respective inner surfaces of the opposed base plates, and a smectic liquid crystal compound inserted between the opposed base plates at an interval less than a spiral pitch of the liquid crystal compound so that the liquid crystal compound is aligned by the alignment membranes to establish two bi-stable optical states; means for applying a liquid crystal operating voltage of one polarity in a first half of an electrode selecting operation to the electrodes so as to select one of the two bi-stable optical states and for applying another liquid crystal operating voltage of another polarity in a second half of the electrode selecting operation to the electrode so as to select the other bi-stable optical state, and means for applying to the electrodes an alternating voltage which is less than the liquid crystal operating voltage in a non-electrode selecting operation so as to hold the selected bi-stable optical state.

24. A liquid crystal display device comprising: a pair of opposed electrodes; a ferro-electric liquid crystal disposed between the pair of electrodes so that the ferro-electric liquid crystal loses a spiral molecular alignment thereof to establish two bi-stable molecular alignments in which molecules of the ferro-electric liquid crystal are not aligned in parallel to the boundary surface of the liquid crystal; means connected to the electrodes for applying an electric signal to the liquid crystal in a time-sharing mode to select one of the two bi-stable molecular alignments; and a pair of polarizers for sandwiching the ferro-electric liquid crystal.

25. A ferro-electric liquid crytal electro-optical device comprising: a pair of opposed electrodes; a ferro-electric liquid crystal disposed between the opposed electrodes such that the electric liquid crystal loses a spiral molecular alignment thereof to establish two bi-stable molecular alignments; drive means for applying to the electrodes in a time-sharing mode a selected electric signal sufficient to change one of the bi-stable molecular alignments of the ferro-electric liquid crystal to the other bi-stable molecular alignment and for applying to the electrodes an A.C. electric signal having an amplitude and a pulse width insufficient to change one of the bi-stable molecular alignments of the ferro-electric liquid crystal to the other bi-stable molecular alignment, the A.C. electric signal being effective to hold the bi-stable molecular alignment; and a pair of polarizers for sandwiching the ferro-electric liquid crystal.

26. A device as claimed in claim 25; wherein the drive means includes means for applying a selected electric signal in the form of a voltage $\pm V_{ap}$ having a given pulse amplitude and a pulse width, and means for applying an A.C. electric signal in the form of an A.C. pulse voltage having a pulse amplitude and a pulse width at least one of which is less than that of the selected voltage $\pm V_{ap}$.

27. A device as claimed in claim 25; wherein the drive means includes means for applying an A.C. electric signal having a high frequency sufficient to avoid degradation of an optical transparent intensity of the ferro-electric liquid crystal.

28. A device as claimed in claim 25; wherein the drive means includes means for applying a selected electric signal containing a D.C. component.

29. A device as claimed in claim 25; wherein the drive means includes means for applying a selected electric signal containing no D.C. component.

30. A device as claimed in claim 25; wherein the drive means includes means for effecting a first scanning operation for selecting one of the two bi-stable molecular alignments and a second scanning operation for selecting the other bi-stable molecular alignment during one frame of operation.

31. A device as claimed in claim 25; wherein the drive means includes means for applying a selected electric signal comprised of a first pulse effective to reset the molecular alignment to one of the bi-stable molecular alignment and a successive second pulse having an opposite polarity effective to change the reset molecular alignment of the other bi-stable molecular alignment.

32. A device as claimed in claim 25; wherein the electric signal comprises an electric voltage signal and the A.C. electric signal comprises an A.C. electric voltage signal.

33. A liquid crystal optical device comprising: a liquid crystal layer comprised of ferro-electric liquid crystal molecules aligned to establish two optically distinctive bi-stable states in the liquid crystal layer; a pair of opposed electrode means sandwiching therebetween the liquid crystal layer; and drive means connected between the pair of electrode means for applying a selecting electric signal to the liquid crystal layer to select one of the two bi-stable states and for applying a holding AC electric signal to the liquid crystal layer to hold the selected bi-stable state.

34. A liquid crystal optical device as claimed in claim 33; wherein the liquid crystal layer has a thickness smaller than a pitch of a spiral alignment of the ferro-electric liquid crystal molecules so that the ferro-electric liquid crystal molecules lose their spiral alignment and re-align in two bi-stable alignments so as to establish the two optically distinctive bi-stable states of the liquid crystal layer.

35. A liquid crystal optical device as claimed in claim 33; wherein the pair of opposed electrode means comprise two sets of a plurality of electrodes intersecting with each other to define a plurality of optical elements at the intersections.

36. A liquid crystal optical device as claimed in claim 35; wherein the drive means includes time-sharing means connected between the two sets of electrodes to sequentially assign a time slot to each of the optical elements to drive the optical elements in a time-sharing mode.

37. A liquid crystal optical device as claimed in claim 36; wherein the time-sharing means includes means for applying a selecting signal to each optical element during the time slot assigned thereto and for applying a holding AC electric signal to each optical element during consecutive time slots assigned to the other optical elements.

38. A liquid crystal optical device as claimed in claim 37; wherein the means for applying the selecting and holding AC electric signals includes means for applying a selecting electric signal having an electric power sufficient to switch one of the two bi-stable states to the other bi-stable state and for applying a holding AC electric signal having an electric power insufficient to switch the bi-stable state so as to hold the bi-stable state.

39. A liquid crystal optical device as claimed in claim 33; wherein the device comprises a liquid crystal display device.

40. A liquid crystal optical device as claimed in claim 33; wherein the device comprises a liquid crystal shutter device.

41. A liquid crystal optical device as claimed in claim 33; wherein the selecting electric signal comprises a selecting electric voltage signal and the holding AC electric signal comprises a holding AC electric voltage signal.

* * * * *